United States Patent
Chari et al.

(10) Patent No.: US 11,627,010 B2
(45) Date of Patent: Apr. 11, 2023

(54) METHOD TO SUPPORT REDUNDANCY SWITCHING OF VIRTUAL MAC CORES

(71) Applicant: ARRIS Enterprises LLC, Suwanee, GA (US)

(72) Inventors: Santhana Chari, Johns Creek, GA (US); Mircea Orban, Toronto (CA); David E. Virag, Johns Creek, GA (US)

(73) Assignee: ARRIS Enterprises LLC, Suwanee, GA (US)

(*) Notice: Subject to any disclaimer, the term of this patent is extended or adjusted under 35 U.S.C. 154(b) by 58 days.

(21) Appl. No.: 16/950,578

(22) Filed: Nov. 17, 2020

(65) Prior Publication Data

US 2021/0152386 A1  May 20, 2021

Related U.S. Application Data

(60) Provisional application No. 62/939,824, filed on Nov. 25, 2019, provisional application No. 62/937,322, filed on Nov. 19, 2019.

(51) Int. Cl.
*H04L 12/28* (2006.01)
*G06F 9/455* (2018.01)
*H04N 7/173* (2011.01)
*H04N 21/61* (2011.01)

(52) U.S. Cl.
CPC ...... *H04L 12/2801* (2013.01); *G06F 9/45558* (2013.01); *H04N 7/17309* (2013.01); *H04N 21/6118* (2013.01); *H04N 21/6168* (2013.01)

(58) Field of Classification Search
CPC ............ H04L 12/2801; G06F 9/45558; H04N 7/17309; H04N 21/6118; H04N 21/6168
USPC ......................................... 375/222
See application file for complete search history.

(56) References Cited

U.S. PATENT DOCUMENTS

| 11,281,492 B1* | 3/2022 | Rebeja ................. G06F 9/5077 |
| 2004/0034871 A1 | 2/2004 | Lu et al. |
| 2013/0185667 A1* | 7/2013 | Harper ................ G06F 11/0709 715/772 |
| 2015/0092531 A1 | 4/2015 | Bernstein et al. |
| 2016/0091870 A1* | 3/2016 | Jeon ........................ G05B 9/03 700/79 |
| 2016/0328252 A1* | 11/2016 | Singh .................. G06F 9/45558 |
| 2019/0124407 A1 | 4/2019 | Shen et al. |
| 2021/0126848 A1* | 4/2021 | Wang .................. G06F 9/45558 |
| 2021/0216417 A1* | 7/2021 | Li ...................... G05B 19/4184 |

FOREIGN PATENT DOCUMENTS

WO        0213465 A1    2/2002

OTHER PUBLICATIONS

International Search Report and Written Opinion Re: Application No. PCT/US2020/060902 (dated Mar. 2, 2021).

* cited by examiner

*Primary Examiner* — Dominic D Saltarelli
(74) *Attorney, Agent, or Firm* — Chernoff, Vilhauer, McClung & Stenzel, LLP

(57) ABSTRACT

Systems and methods to support switching of virtual cores.

29 Claims, 11 Drawing Sheets

METHOD TO SUPPORT REDUNDANCY SWITCHING OF VIRTUAL MAC CORES

CROSS REFERENCE TO RELATED APPLICATIONS

This application claims the benefit of U.S. Provisional Patent Application No. 62/939,824, filed Nov. 25, 2019, and U.S. Provisional Patent Application No. 62/937,322, filed Nov. 19, 2019.

BACKGROUND

The subject matter of this application relates to systems and methods to support redundancy switching of virtual cores, and in particular to systems and methods to support redundancy switching of virtual cores in a cable television environment. The subject matter of this application also relates to a cable modem termination system with rapid failover capability.

Cable Television (CATV) services provide content to large groups of customers (e.g., subscribers) from a central delivery unit, generally referred to as a "head end," which distributes channels of content to its customers from this central delivery unit through an access network comprising a multitude of intermediate nodes. Modern Cable Television (CATV) service networks, however, not only provide media content such as television channels and music channels to a customer, but also provide a host of digital communication services such as Internet Service, Video-on-Demand, telephone service such as VoIP, home automation/security, and so forth. These digital communication services, in turn, require not only communication in a downstream direction from the head end, through one or more intermediate nodes typically forming a branch network and to a customer, but also require communication in an upstream direction from a customer to the head end typically through a branch network.

To this end, CATV head ends have historically included a separate Cable Modem Termination System (CMTS), used to provide high speed data services, such as video, cable Internet, Voice over Internet Protocol, etc. to cable customers. Typically, a CMTS will include both Ethernet interfaces (or other more traditional high-speed data interfaces) as well as radio frequency (RF) interfaces so that traffic coming from the Internet can be routed (or bridged) through the Ethernet interface, through the CMTS, and then onto the RF interfaces that are connected to the cable company's hybrid fiber coax (HFC) system. Downstream traffic is delivered from the CMTS to a cable modem and/or set top box in a customer's home, while upstream traffic is delivered from a cable modem and/or set top box in a customer's home to the CMTS. Many modern CATV systems have combined the functionality of the CMTS with the video delivery system (e.g., EdgeQAM-quadrature amplitude modulation) in a single platform generally referred to as a Converged Cable Access Platform (CCAP).

Furthermore, many modern architectures relocate the physical layer (PHY) of a traditional CMTS or CCAP to the network's fiber nodes (referred to as a Remote PHY or R-PHY architecture). Thus, while the core in the CMTS/CCAP performs the higher layer processing, the R-PHY device in the remote node converts the downstream data sent from the core from digital-to-analog to be transmitted on radio frequency to the cable modems and/or set top boxes, and converts the upstream radio frequency data sent from the cable modems and/or set top boxes from analog-to-digital format to be transmitted optically to the core. Still other modern CATV systems relocate the control or MAC layer to the fiber nodes as well (called R-MACPHY architectures), or relocate other components into the nodes. Such architectures are generally referred to as Distributed Access Architectures (DAA), Distributed CMTS (D-CMTS), etc. as opposed to integrated architectures where all physical and control layers are located in the head end (e.g., I-CMTS). For simplicity, though this disclosure will subsequently show and describe an "I-CMTS" architecture as one where all CMTS functionality is located in the head end, those of ordinary skill in the art will understand that in a system containing a CCAP, such a description would include an integrated CCAP architecture where all CCAP functionality is located in the head end. Similarly, though this disclosure will subsequently show and describe a D-CMTS architecture where physical portions of the CMTS are pushed into the nodes, those of ordinary skill in the art will understand that such a description would not only include other distributed architectures such as a R-MACPHY, but also distributed CCAP functionality as well where a system uses a CCAP.

A CMTS may provide traffic shaping to prioritize various types of applications traffic, e.g., based upon subscribed data plan or download usage and/or to provide guaranteed quality of service (QoS). Quality of services for high speed data is of high importance for operators. Service outages are one important component of overall quality of service. Subscribers expect data service availability on 24×7 basis. A hardware based CMTS typically has redundancy at the hardware board level such that when a hardware failure is detected, a redundant hardware board can resume service, replacing the failed board, after a very short delay. In most cases, a data service subscriber may not realize that a failure has occurred at the central office. In some cases, where packets are 'in-flight', some packets may be lost. Network protocols such as Transfer Control Protocol (TCP) provide mechanisms to recover packets that are lost during transmission therefore minimizing or eliminating these disruptions to the consumer. In some cases, such as Internet Protocol (IP) video, User Datagram Protocol (UDP) protocol is used where dropped packets are never recovered.

Unfortunately, the distributed architectures as just described tend to have failures resulting in service interruptions. What is desired, therefore, are improved systems and methods for supporting redundancy and/or failover.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 5:
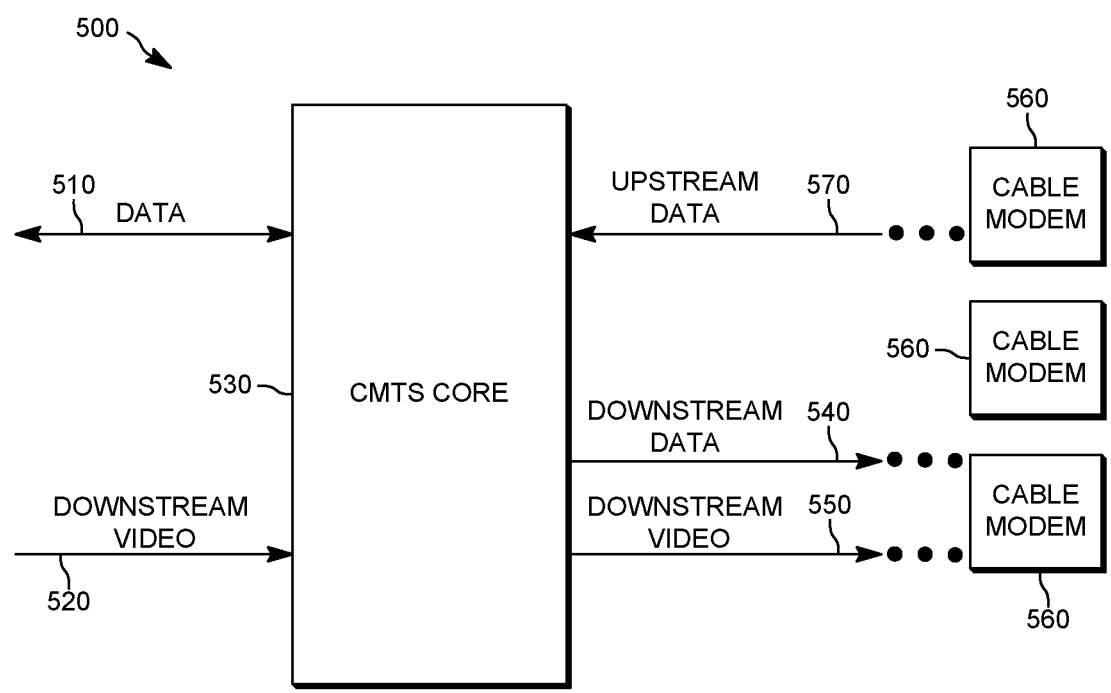
FIG. 5 illustrates an integrated Cable Modem Termination System.

Referring to FIG. 5, an integrated CMTS system 500 may include data 510 that is sent to and received by integrated CMTS 530 (or an integrated CCAP) via the Internet (or other network) typically in the form of packetized data. The integrated CMTS/CCAP 530 may also receive downstream video 520, typically in the form of packetized data from an operator video aggregation system. By way of example, broadcast video is typically obtained from a satellite delivery system and pre-processed for delivery to the subscriber either though a CCAP or a QAM system co-located in a head end with a CMTS. Also by way of example, Internet based video (e.g., YouTube) is typically delivered through a general Internet data pipe to a CMTS. The integrated CMTS system 500 receives and processes the received data 510 and downstream video 520. The CMTS 530 (or CCAP) unifies the cable modem termination system, switching, routing and QAM functionality at the head end, so that all the data, video, voice functions, etc., may be handled over IP before conversion to RF or optical signals. The CMTS 530 may transmit downstream data 540 and downstream video 550 to a customer's cable modem and/or set top box 560 through a network, which may include other devices, such as amplifiers and splitters. The CMTS 530 may receive upstream data 570 from a customer's cable modem and/or set top box 560 through a network, which may include other devices, such as amplifiers and splitters. The CMTS 530 may include multiple devices to achieve its desired capabilities.

Figure 6:
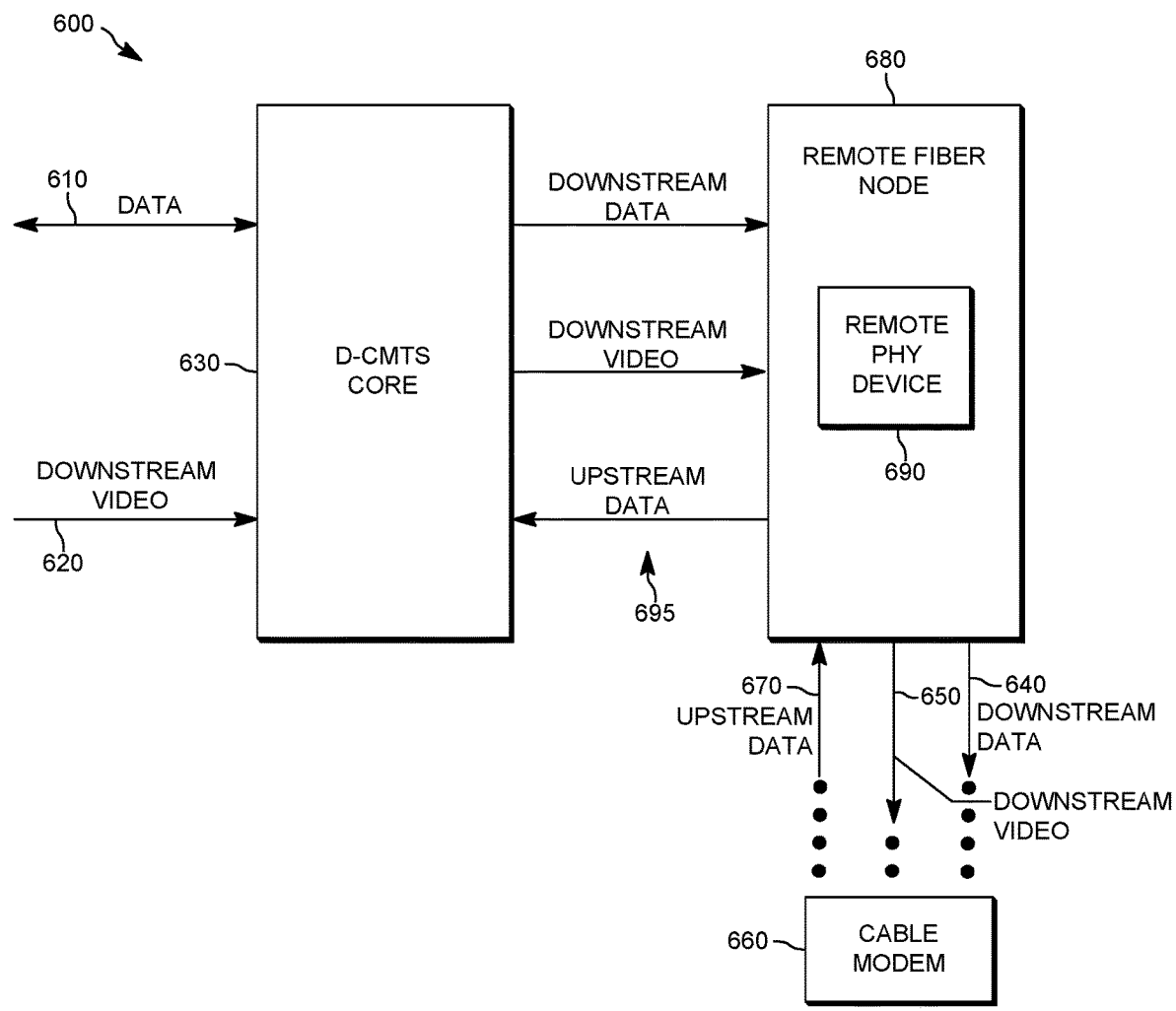
FIG. 6 illustrates a distributed Cable Modem Termination System.

Referring to FIG. 6, as a result of increasing bandwidth demands, limited facility space for integrated CMTSs, and power consumption considerations, it is desirable to use a D-CMTS system 600 (or Distributed Converged Cable Access Platform). The D-CMTS system 600 distributes a portion of the functionality of the I-CMTS system 500 as previously described downstream to a remote location, such as a fiber node, using network packetized data. An exemplary D-CMTS system 600 may include a remote PHY architecture, where a remote PHY (R-PHY) is preferably an optical node device that is located at the junction of the fiber and the coaxial. The D-CMTS system 600 may include a D-CMTS core 630 that sends and receives data 610 over the Internet (or other network) typically in the form of packetized data. The D-CMTS core 630 may also receive downstream video 620, typically in the form of packetized data from an operator video aggregation system. The D-CMTS core 630 receives and processes the received data 610 and downstream video 620. A remote Fiber node 680 preferably include a remote PHY device 690. The remote PHY device 690 may transmit downstream data 640 and downstream video 650 to a customer's cable modem and/or set top box 660 through a network, which may include other devices, such as amplifier and splitters. The remote PHY device 690 may receive upstream data 670 from a customer's cable modem and/or set top box 660 through a network, which may include other devices, such as amplifiers and splitters. The remote PHY device 690 may include multiple devices to achieve its desired capabilities. The remote PHY device 690 primarily include PHY related circuitry, such as downstream QAM modulators, upstream QAM demodulators, together with pseudowire logic to connect to the D-CMTS core 630 using network packetized data. The remote PHY device 690 and the D-CMTS core 630 may include data and/or video interconnections, such as downstream data, downstream video, and upstream data 695.

By way of example, the remote PHY device 690 may covert downstream DOCSIS (i.e., Data Over Cable Service Interface Specification) data (e.g., DOCSIS 1.0; 1.1; 2.0; 3.0; 3.1; and 4.0 each of which are incorporated herein by reference in their entirety), video data, out of band signals received from the D-CMTS core 630 to analog for transmission over RF or linear optics. By way of example, the remote PHY device 690 may convert upstream DOCSIS, and out of band signals received from an analog medium, such as RF or linear optics, to digital for transmission to the D-CMTS core 630. As it may be observed, the R-PHY may move all or a portion of the DOCSIS MAC and/or PHY layers down to the fiber node. In some cases, the remote PHY and/or remote MAC PHY functionality may be provided at the head end.

I-CMTS devices are typically custom built hardware devices that consist of a single chassis that include a series of slots, each of which receives a respective line card with a processor, memory, and other computing and networking functions supported thereon. Each of the line cards include the same hardware configuration, processing capabilities, and software. Each of the line cards performs the functions of the I-CMTS device, including the MAC and PHY functionality. As the system increasingly scales to support additional customers, additional line cards are included with the system to expand the processing capability of the system. To provide processing redundancy, one or more additional line cards are included that are assigned as "back-up" cards. In the event of a failure of one of the "active" line cards, such as a failed software process and/or a failed hardware, an active redundancy monitoring software processes assigns one of the "back-up" cards to be an "active" card by migrating the processing previously performed by the failed card to the assigned "back-up" card. In this manner, a high-availability and redundant system may be achieved using the line cards of the I-CMTS devices.

Also, described herein are techniques for a virtual CMTS with failover capability. In the following description, for purposes of explanation, numerous examples and specific details are set forth in order to provide a thorough understanding of some embodiments. Some embodiments as defined by the claims may include some or all of the features in these examples alone or in combination with other features described below, and may further include modifications and equivalents of the features and concepts described herein.

In the case of a virtual (or "virtualized") CMTS, CMTS core functionality may be provided in a software application that runs on a computing device, e.g., including general purpose central processing unit (CPU). Hardware functionality that included the automated detection and swapping of hardware components in the case of a failure are no longer available in the traditional sense or are different than a purpose-built hardware appliance. Such an event is known as a failover and requires switching to a redundant or standby computer server, system, hardware component or network upon the failure or abnormal termination of a previously active application, server, system, hardware component or network. Some embodiments implement failover functions in software and thereby allow possible failures that are software induced and not based on hardware failure or malfunction. Finally, whereas a specialized hardware CMTS is a single appliance composed of redundant hardware elements and services, e.g., up to 50,000 subscribers, a virtual CMTS core may service a few hundred subscribers and have no component redundancy. Hence, in the event of a virtual CMTS failure, the entire CMTS may be considered failed, as opposed to a small subset of the overall CMTS. Because failures occur differently in software and the level of failure is generally considered catastrophic to the entire virtual CMTS, traditional CMTS failover mechanisms may not be utilized or effective in a virtual CMTS environment.

Figure 1:
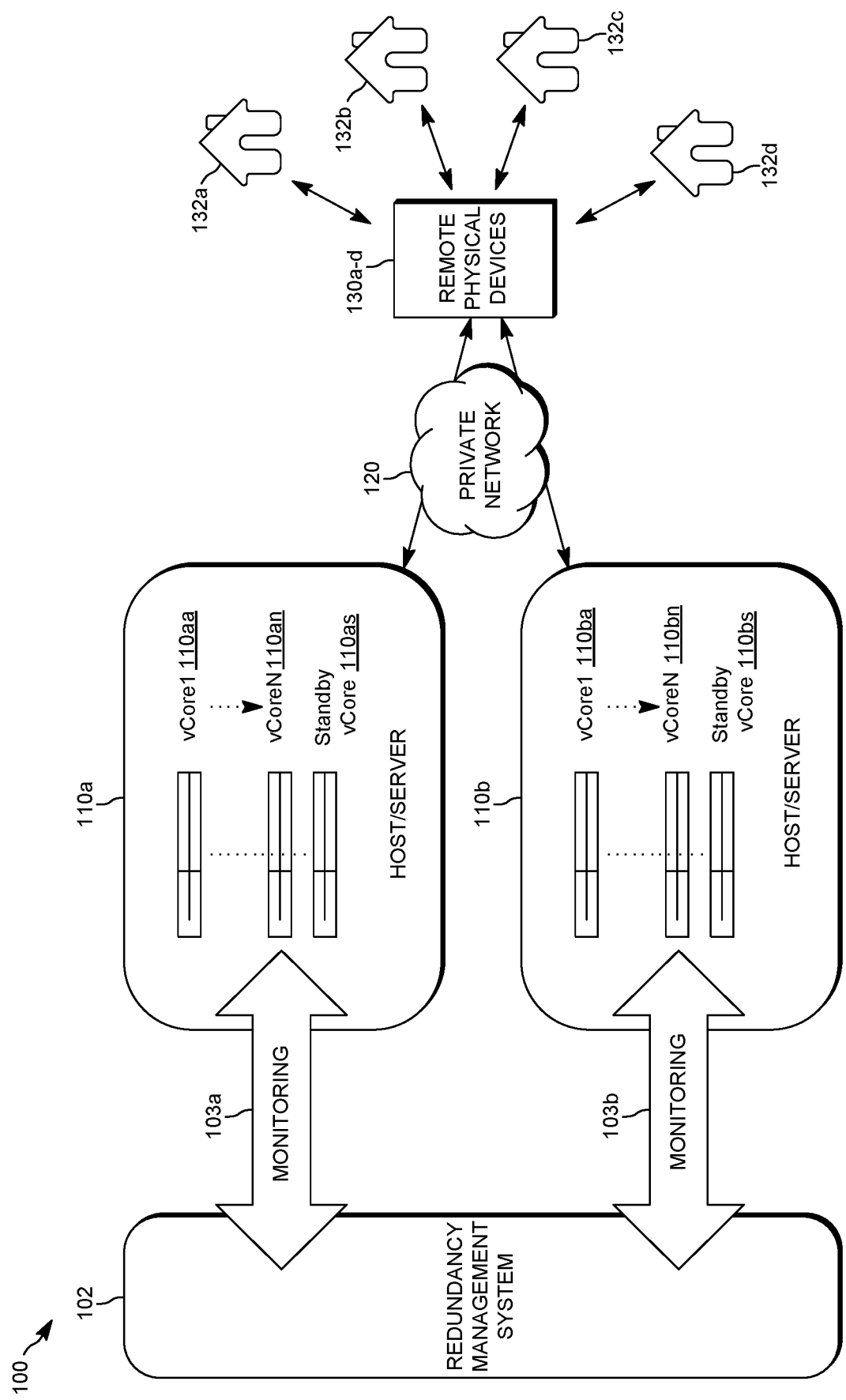
FIG. 1 depicts a generalized model of a portion of a data center network with CMTS functionality implemented using multiple virtual CMTS cores (vCOREs) according to some embodiments.

FIG. 1 depicts a generalized model of a portion of a data center network 100 with CMTS functionality implemented using multiple virtual CMTS cores according to some embodiments. For example, a data server 110a, 110b may host one or more virtual CMTS cores (vCores) 110aa-110an, 110ba-110bn and standby virtual CMTS cores 110as, 110bs that are connected to a network 120 through network data switches (not shown) that enable network data packet connections between each virtual CMTS core 110 and one or more Remote Physical Devices (RPDs) 130a-130d. Physical layer-related circuitry is located in remote physical devices 130a-130d, which is located closer to subscriber premises 132a-132d in the network than virtual CMTS cores 110aa-110an, 110as, 110ba-110bn, 110bs. In some embodiments, virtual CMTS cores may be a converged cable access platform (CCAP) core. Virtual CMTS cores may be located in a headend and remote physical devices 130a-130d provide interfaces between cable modems at subscriber premises 132a-132d and virtual CMTS cores 110aa-110an, 110as, 110ba-110bn, 110bs. Although a remote physical device is described, the physical layer components may be located in the datacenter, but not in virtual CMTS cores. Each virtual CMTS core 110aa-110an, 110as, 110ba-110bn, 110bs may be implemented as a virtualized software application running on a server 110a, 110b that includes one or more processes that function in a coordinated manner. Each virtual CMTS core 110aa-110an, 110as, 110ba-110bn, 110bs may operate independently and use general operating system services resident on or otherwise available to the server hardware platform and may also share certain platform resources.

As discussed in more detail below, a redundancy management system (RMS) 102 monitors operations of the virtual CMTS cores 110aa-110an, 110ba-110bn via monitoring processes 103a, 103b to detect failures, and maintains the readiness of the standby virtual CMTS cores 110as, 110bs by copying and updating checkpointing data of active virtual CMTS cores 110aa-110an, 110ba-110bn.

A data server may be a multi-core enterprise level server. A multi-core processor is typically a single physical integrated circuit (IC or "chip") that includes more than one processing units (cores). Each core may operate independently and be capable of performing effectively as a separate computer with an exception that some resources used by the respective cores are shared among all cores. For example, each core may have its own local level 1 (L1) and level 2 (L2) memory cache but share a level 3 (L3) memory cache. Other resources, such as hard drive or network (e.g., LAN or WAN) access may also be shared resources. Server expansion ports, such as peripheral component interconnect express (PCIe), may also be shared to allow for additional hardware resources, such as a cryptographic accelerator or high speed network interface cards (NICs), to be added or included as server resources for sharing among all applications within the system. Hence, unlike a purpose-built hardware CMTS, data center server hosting cores may be general purpose and used for many tasks, such as for virtual CMTS cores 110. When such servers are initially placed in the data center, they may have no software or perhaps only an operating system (OS) available on the server. Accordingly, the redundancy management system 102 acts as a manager element to assist in the orchestration and/or deployment of virtual CMTS core applications among the data center servers.

Current tools for maintaining general data center application availability include using containers and the services provided with containers. For example, some containers include services to help load balancing and maintain processing capacity for data applications, with a load-balancer to provide process requests to one of many identical backend applications. In the event a software container fails, a controller will restart a new container (software application) of the same type and attach it to the load balancer to maintain the overall processing capabilities. However, many seconds may pass before a failure is detected and redeployment of a new container initiated. Plus, the redeployment requires invocation of a container management daemon on the host for which the container manager must then pull an image from an image repository, set the container environment, and then start the container. This process, from start to finish, may take many seconds or perhaps minutes before the new container is configured and attached to the load-balancer to begin servicing processing requests. Hence, containers allow for managing automated redeployment of an application if an application has failed, and typically works within the context of a load-balancer using multiple instances of a backend application for processing data requests where the backend applications are stateless.

In accordance with example embodiments, the availability of virtual CMTS cores 110 may be maintained in manners significantly different than those possible with current tools, such as the containers. For example, virtual CMTS cores 110 are not stateless applications. As discussed in more detail below, during the life of a virtual CMTS core 110, configurations or settings needed for the application to be maintained for the near-term future are updated. For example, a virtual CMTS core 110 may have forwarding tables that evolve over its life and whose availability would need to be maintained should the virtual CMTS core 110 fail and be replaced. Further, virtual CMTS cores 110 are important service providers for a remote physical device 130 that may not be controlled by a load-balancer that shares process requests among other backend processes. In such situations, a virtual CMTS core failure may halt all processing of data packets for a remote physical device 130. Also, virtual CMTS cores 110 as data plane processes are real-time events that process a data packet upon its arrival to minimize its delivery latency, unlike in typical data center applications that do not have low-latency requirements and may queue up processing requests prior to actually handling them. When remote physical device packet processing is stopped, data services for a data customer are also stopped thereby causing a service outage. Moreover, if packet processing is halted beyond a specified threshold, modems in subscriber premises 132 may reset thereby requiring a new modem configuration sequence to be initiated for each modem once the link has been re-established (e.g., when a new virtual CMTS core 110 is made available). Such events will exacerbate the initial outage due to the additional time needed for a cable modem to step through a configuration sequence. Finally, if a remote physical device does not receive packets from the virtual CMTS core 110 for a specified time and is thereby caused to reset, it should be re-attached to a virtual CMTS core 110, establish new network tunnels, and be reconfigured along with its modem. Such reconfiguration and/or restart processes may take several minutes, which is unacceptable to service providers for maintaining a desired subscriber quality of service.

In accordance with example embodiments, redundancy management system 102 is responsible for monitoring and managing the overall availability for virtual CMTS cores 110. Redundancy management system 102 may be implemented as a standalone process or may be included as part of a larger management application. For maintaining high availability with use of virtual CMTS cores 110, several events are involved: (1) a virtual CMTS core failure is detected; (2) a new or replacement virtual CMTS core 110 is made available to assume services provided by the failed virtual CMTS core 110; and (3) the new or replacement virtual CMTS core 110 is configured (e.g., restored) to an operational state of the failed virtual CMTS core 110. When such steps are taken in a sufficiently timely manner, e.g., prior to a modem reset, for both an individual virtual CMTS core failure case and a virtual CMTS core server failure case, overall system operation and/or performance may continue with virtually no degradation(s).

While a virtual CMTS core architecture uses container technology as opposed to virtual machine technology as described above, the foregoing general description remains applicable. In containerized systems, a single OS operates on the server with applications isolated using containers as method with which to isolate an application from other applications managed by the OS. For example, the process identification (PID) space is unique for each containerized virtual CMTS core application such that if the process looks at its PID table it will not see or know about other processes running in different PID spaces. Similarly, each isolated virtual CMTS core application has its own network name space such that it can set its own network configuration independently from other applications not within its network name space. In contrast to higher level management systems (e.g., Kubernetes) that combine and mange lifecycles for multiple containers within a single isolation space (referred to as a POD), each virtual CMTS core 110 may be instantiated as a POD, or collection of containers, with each in its own isolated space. Although containers are discussed, various virtualization technologies may be used.

Figure 2A:
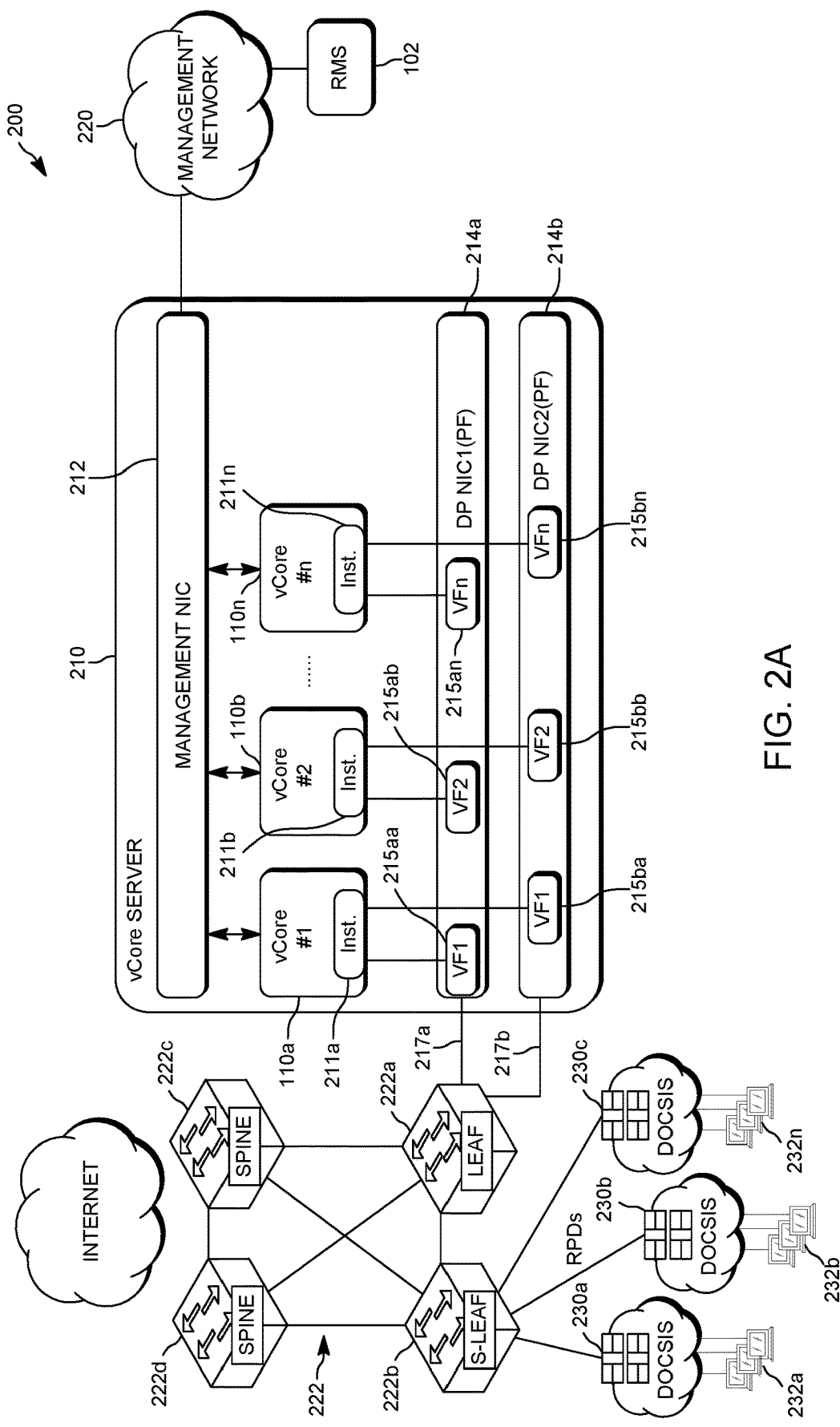
FIG. 2A depicts an implementation of a vCORE server system according to some embodiments.

FIG. 2A depicts an implementation of virtual CMTS core system 200 with a server 210 containing multiple virtual CMTS cores and network interface cards (NICs) according to some embodiments. A virtual CMTS core server 210 may contain multiple virtual CMTS cores 110a-110n and may also contain a management NIC 212 and multiple (e.g., two in this example) data plane NICs 214a, 214b. The management NIC 212 is used for traditional server administration and monitoring. The data plane NICs 214a, 214b may be very high speed NICs connected through expansion slots on the server chassis with a PCIe bus for data communications between the NICs 214a, 214b and the server CPU and memory, e.g., input, processing, and output of the high speed data services managed by virtual CMTS cores 110a-110n. The data plane NICs have physical link connections 217a, 217b with a network 222. Network 222 may be implemented as a leaf-spine network that includes a top-of-rack switch 222, e.g., implemented as one or more leaf switches 222a, 222b and spine switches 222c, 222d. However, other network configurations may be used. The leaf switch 222a sends data packets to the appropriate next switch (e.g., leaf or spine), depending on the packet IP addresses and its forwarding rules, for routing through the network to the appropriate destinations. Network 222 is connected to remote physical devices 230a-230c, which are then coupled to subscriber devices 232a-232n.

A virtual CMTS core server 210 may be implemented as a commercial grade multi-core data center server that includes high-speed data network interface cards (NICs). Typically, a NIC is a shared resource among all processes executing on the server and, in typical data center situations, the server operating system (OS) managed how network data packets are queued for transmission or distributed upon reception to the various processes running on the OS. With cloud architectures and increased uses of virtualization, simple sharing of resources such as a NIC via the server operating system have become less practical, since each virtual machine running on a server generally includes its own OS which complicates sharing of resources. To support added complexities introduced by virtual machines operating simultaneously on a server, NIC functionality has also been implemented as one or more virtual NICs, e.g., with each previously single NIC resource becoming one of multiple virtual NIC resources. With virtual NIC resources, each virtual OS running on the server may then control its own virtual NIC without knowledge of other virtual NICs that are in use by other virtual machines on the server. These NICs include: (1) physical functions (PF), e.g., the base NIC running without virtualization; and (2) virtual functions (VF) 215aa-215bn, e.g., virtual functions that may be created within a physical function. Typically, virtual functions are configured on a NIC through a configuration in the physical function. For example, single root input/out virtualization (SRIOV) is an industry designated standard for modeling and configuring virtual functions on a physical function.

Each data plane NIC 214a, 214b may be designated as a physical function. When the server is initially configured as a virtual CMTS core server 210, a software configuration application determines the installed NICs and configures each physical function for a number of virtual functions 215aa-215an, 215ba-215bn. For purposes of this example, the number of virtual functions 215aa-215an, 215ba-215bn may be related to the number of cores in the CPU with the number of cores in the CPU thereby determining the total number of virtual CMTS cores 110a-110n that may eventually be deployed on the server 210. Each physical function 214a, 214b is provided a virtual function 215aa-215an, 215ba-215bn for each virtual CMTS core thereby establishing a virtual function 215aa-215an, 215ba-215bn on each of the data plane NICs 214a, 214b for each virtual CMTS core 110a-110n. Hence, for example, upon deployment of a virtual CMTS core 110a, the two virtual functions 215aa, 215ba are assigned or reserved to the virtual CMTS core 110a so that no other virtual CMTS cores 215ab-215an, 215bb-215bn may use those virtual functions 215aa, 215ba.

Configuration of a virtual function includes defining a unique MAC address and IP address. When a packet destined for a virtual CMTS core 110 enters a leaf switch, the destination IP address is checked and then transmitted to the NIC based on the destination MAC address of the virtual function. Upon receiving a packet at the NIC, the IP address of the packet is checked for association with the virtual functions. When the IP address matches the virtual function configured address the packet is then moved to a memory location in the server. Moving the packet to memory may be done using direct memory access (DMA) such that the hardware in the NIC moves the data into memory without need for CPU resources from the server. The data plane application for the virtual CMTS core 110 associated with the virtual function can then poll the memory looking for updates. This memory queue management functionality may be provided using installations (Inst) 211a-211n, which may be kits, of a software driver that may optimize virtual function performance for network data plane functions.

Outgoing packets behave similarly. When a virtual CMTS core 110 has a packet to send outbound, installation 211 places the packet into a pre-determined memory queue where the virtual function process in the NIC pulls the packet and transmits to the leaf switch using the virtual function MAC address as the source MAC address and the leaf switch MAC address as the destination MAC address. The packet is received at the leaf switch and processed through the network to its destination.

In the case of a high availability switchover for a virtual CMTS core, a new virtual CMTS core 110 is to be attached to a virtual function (VF) 215. The IP address associated with the new virtual CMTS core 110 will be the same IP address provided to the original virtual CMTS core 110 so that the remote physical device (RPD) does not require a reset. If the new virtual CMTS core can inherit the MAC address then nothing further needs to be updated at the leaf switch, since packets destined for the virtual CMTS core IP address will be transmitted to the MAC address associated with the NIC/virtual function. If the new virtual CMTS core 110 cannot inherit the MAC address due to limitations in software or other reasons, a new MAC address may be assigned to the replacement virtual CMTS core 110 such that his new MAC address is associated with the IP address at the leaf switch to replace the initial mapping. This may be accomplished using a gratuitous address resolution protocol (ARP) message from the virtual CMTS core 110 to the top of the rack switch 222a in the local network. Ideally, a replacement virtual CMTS core may simply inherit the entire virtual function (e.g., IP address, MAC address, DMA memory pointers, etc.) so that any data within the incoming memory queue may be processed by the replacement virtual CMTS core with minimal packet loss.

Figure 2B:
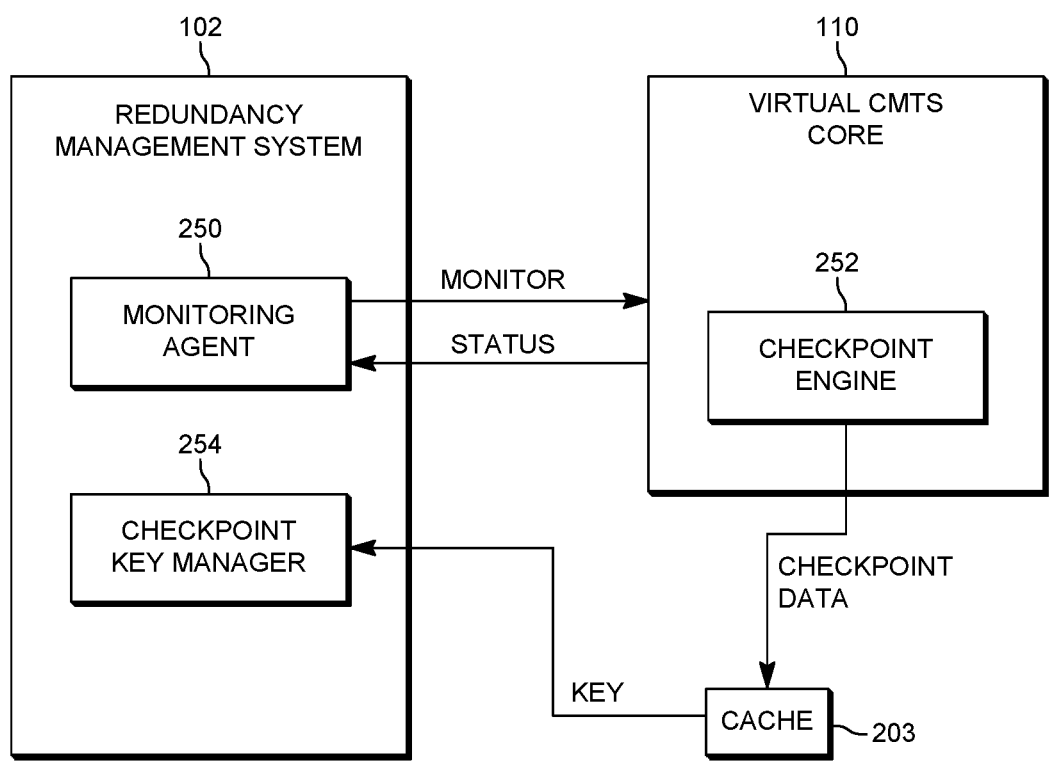
FIG. 2B depicts operations within a vCORE server system according to some embodiments.

FIG. 2B depicts operations within a virtual CMTS core server system according to some embodiments. Redundancy management system 102 may use different methods to detect a failure of virtual CMTS cores 110. For example, a monitoring agent 250 may monitor virtual CMTS cores 110 for failures. Monitoring agent 250 may reside on the same host server as the virtual CMTS cores 110 it monitors, or it may reside on an external server and monitor multiple virtual CMTS cores 110 on multiple host servers.

In one method, monitoring agent 250 may use a heartbeat link between each of the individual processes composing a virtual CMTS core 110 and a monitoring agent 250 to detect the failure of an individual virtual CMTS core 110. The heartbeat may be a small, regularly timed message sent from the process and received by the monitoring agent. If any of the process components fail to maintain the heartbeat message, monitoring agent 250 determines that the virtual CMTS core 110 may have failed and initiates a failover process. For example, if there are four process components composing a virtual CMTS core 110, failure to maintain a heartbeat by any of the four would be indicative of a failed virtual CMTS core 110. The heartbeat interval between consecutive messages may be set appropriately such that a failure is determined in a timely manner, e.g., within a few seconds.

Also, monitoring agent 250 may use a polling method of detecting a virtual CMTS core failure in which redundancy management system 102 actively may send a health polling message to virtual CMTS core 110. Monitoring agent 250 is responsible for monitoring and reporting the health status of all virtual CMTS core processes and may thus serve as a single point of contact for a monitor poll. Monitoring agent 250, in turn, may use a polling technique or a heartbeat mechanism to determine health from the other virtual CMTS core processes.

In another approach, monitoring agent 250 may use externally generated network Internet Control Message Protocol (ICMP) packets, such as the network "ping" message to detect a failed virtual CMTS core 110. Ping packets addressed to the network interface card should return a response packet when functioning properly. If monitoring agent 250 sends a ping message to a virtual CMTS core IP address and no subsequent matching response is received, monitoring agent 250 may consider the virtual CMTS core 110 as failed. Monitoring agent 250 may send the ping packets at regular intervals to ensure timely identification of virtual CMTS core state. The ping packets may be received at the virtual CMTS core network interface from the top-of-rack switch such that monitoring agent 250 in this case may be within the same local network or otherwise capable of reaching the virtual CMTS core local network.

If monitoring agent 250 is responsible for tracking multiple virtual CMTS cores 110, monitoring agent 250 may maintain a status for all of the processes composing each virtual CMTS core 110 independently. The virtual CMTS core processes may use the operating system (OS) time services to determine the appropriate time to send the heartbeat message. In the event that operating system services are not available for the process due to a container not being able to access the operating system calls, the process may write a message to shared memory such that monitoring agent 250 or another virtual CMTS core process may periodically check for such message to acknowledge the process is operating properly. For example, the message may be the number of packets processed since the last message update, or a simple counter incremented every time the process loops through its set of instructions.

As discussed above, a virtual CMTS core 110 is a stateful application since its current actions and/or responses are dependent on some former actions and/or responses of the virtual CMTS core. Hence, a current state of a virtual CMTS core 110 is dependent on its initial configuration plus effects of operational details that are generated after such initial configuration. The initial configuration may include settings or configurations such as radio frequency (RF) channel settings and grouping definitions, while other information such as L2TPv3 tunnels may be negotiated after the initial configuration. A virtual CMTS core checkpoint engine 252 records stateful information to a memory cache 203 in the event restoration is required in the future. Cache 203 may be part of redundancy management system 102, or be located in other devices. For data designated as checkpoint data, checkpoint engine 252 may update cache 203 any time the value of that data is changed. It is desirable for the memory cache to be fast and thus may be held in random access memory (RAM) in a local host or a dedicated host within the local network. The memory cache 203 may also be maintained across redundant hosts to minimize the loss of data due to a host failure. Because multiple virtual CMTS cores 110 will be checkpointing information to the memory cache, each virtual CMTS core 110 may have a unique identifier associating the checkpoint cache with the specific virtual CMTS core 110. Redundancy management system 102 may include a checkpoint key manager 254 that stores information for a location of checkpoint information for different virtual CMTS cores 110, such as checkpoint key manager 254 maintains knowledge of the association key. Checkpoint key manager 254 may assign an association key to each virtual CMTS core 110, or alternatively, an agreed upon system algorithm may be defined to create associations. For example, each virtual CMTS core 110 may have a unique name for use as the association key for the checkpoint data in the memory cache.

Checkpoint key manager 254, or other elements, may maintain other checkpoint items may also be helpful to enable fast restoration of a virtual CMTS core 110 in the event of a failure or other event. Examples may include cable modem registration data, DHCP leases, remote physical device states, security certificates and associations, IP stack states, and a MAC database.

Cable modem registration data is specific information unique to each cable modem registered within the system that includes details on service subscriptions and service level. Before services may be resumed to a cable modem, the service level information is needed so that the appropriate quality of service (e.g. maximum upstream and/or downstream bit rates) may be established.

A DHCP lease ensures that each cable modem has a unique IP Address by providing a unique address and an expiration time for that address. The expiration time facilitates reallocation of IP addresses that are no longer used back into the general pool for future re-assignment. Checkpointing this information enables quick restoration to resume services to each cable modem client.

The remote physical device (RPD) state information includes information needed to resume network communications with the RPD, such as IP address for the RPD, RPD configuration, and L2TPv3 configuration. A RPD configuration includes general settings which have been passed to the RPD, e.g., via a Generic Control Plane (GCP) protocol. A L2TPv3 configuration includes L2TPv3 data tunnels and channel mappings which have been setup at run time between the RPD and the virtual CMTS core 110.

Security certificates and associations are used to provide authentication and privacy between elements within the system. In the case of the virtual CMTS core 110, a certificate chain may be resident for validation of cable modem clients and RPDs to ensure authenticity of each cable modem receiving services.

The IP stack state for a virtual CMTS core 110 includes the forwarding information base (FIB) and one or more routing protocols for maintaining and updating the FIB. Each protocol has a state associated with it for maintaining and trading routing information with peering networks. The IP stack state also includes virtual CMTS core IP addresses, the address resolution protocol (ARP) entries and routing tables.

The MAC database may include a list of cable modem MAC addresses in the service group serviced by the virtual CMTS core 110. This database may also include mappings of cable modem to consumer premises equipment (CPE), such as IP addresses, MAC addresses and ARP entries, for customer premise equipment attached to each of the cable modems within the service group.

Once redundancy management system 102 has detected a virtual CMTS core failure, redundancy management system 102 initiates deployment of a replacement virtual CMTS core 110, complete with any stateful information necessary to quickly resume services to the remote physical device. As noted above, the replacement virtual CMTS core 110 may be on the same host server or another host server elsewhere within the system network.

Restoration includes starting another virtual CMTS core application and reloading the previously saved and updated checkpoint information from the now failed virtual CMTS core 110. This process may be implemented to minimize any downtime of services for the downstream subscriber(s) by employing a pre-deployment strategy. For example, a pre-deployment process may include redundancy management system 102 starting an application for virtual CMTS core 110 on a server with any hardware level configuration(s) necessary for the application to function on the server with shared server resources. The virtual CMTS cores 110 that are configured for pre-deployment may be operational though not yet fully or finally configured with updated state information.

Redundancy management system 102 may determine and assign the most appropriate available virtual CMTS core 110 for restoration of services, which may be dependent on several factors such as hardware and/or resource availability. Once a replacement virtual CMTS core 110 has been identified, redundancy management system 102 provides the association for checkpoint retrieval associated with the failed virtual CMTS core 110 in the memory cache 203. The replacement virtual CMTS core 110 may download the checkpoint states, including the running configuration, from the memory cache 203, and the MAC address of the failed virtual CMTS core 110 which is configured in the network interface adaptor as one of the virtual functions. In the event the replacement virtual CMTS core 110 resides on the same host server, the network interface adaptor may still be configured with the MAC address and may then be updated with the DMA memory associated with the replacement virtual CMTS core 110 such that new data packets addressed for this MAC address are re-directed to the new memory location associated with the replacement virtual CMTS core 110. In the event the replacement virtual CMTS core 110 resides on a different host server, the network interface adaptor on that server may be configured with the MAC address of the failed virtual CMTS core 110 in addition to the appropriate DMA memory location associated with the replacement virtual CMTS core 110. A gratuitous address resolution protocol request may then be sent to the edge or top-of-rack switch to initiate updating of the virtual CMTS core MAC address in the port table at the switch to ensure that data packets destined for the replacement virtual CMTS core 110 may be sent to the appropriate switch port. To avoid potential conflicts, redundancy management system 102 may remove the MAC address from the network adaptor of the original host server.

With the replacement virtual CMTS core 110 thus assigned, deployed and configured, it may begin resumed operation(s), including checkpointing its data to memory cache. The replacement virtual CMTS core 110 may use a new checkpoint key or the existing checkpoint key may be used so long as the checkpoint key remains unique to a single virtual CMTS core 110. In addition to selecting and configuring a replacement virtual CMTS core 110, redundancy management system 102 also manages cleanup and removal of the failed virtual CMTS core 110 and any resource associations, including ensuring that shared resources attached to the failed virtual CMTS core 110 are detached and made available for new virtual CMTS core 110. Such resources may include shared server resources, such as virtual network interfaces, reserved CPU cores, or access to a cryptographic accelerator. Redundancy management system 102 may also initiate and manage pre-deployment of a new virtual CMTS core 110 as a replacement for a future virtual CMTS core failure, including launching a virtual CMTS core 110 on a server, reserving resources necessary for the virtual CMTS core 110, and initiating basic configuration of virtual CMTS core hardware interface drivers.

Full deployment of the replacement virtual CMTS core 110 also includes re-establishing security information, such as security associations, with the remote physical device (RPD). Redundancy management system 102 may use the original host private keys/certificates associated with the original (now failed) virtual CMTS core 110 or may use a new host private key/certificate so long as the new host certificate is associated with the same root certificate authority (CA) as the initial host certificates. While this security association may be re-established after virtual CMTS core 110 becomes operational, the RPD configuration may not be changed until the new security association is completed.

Figure 2C:
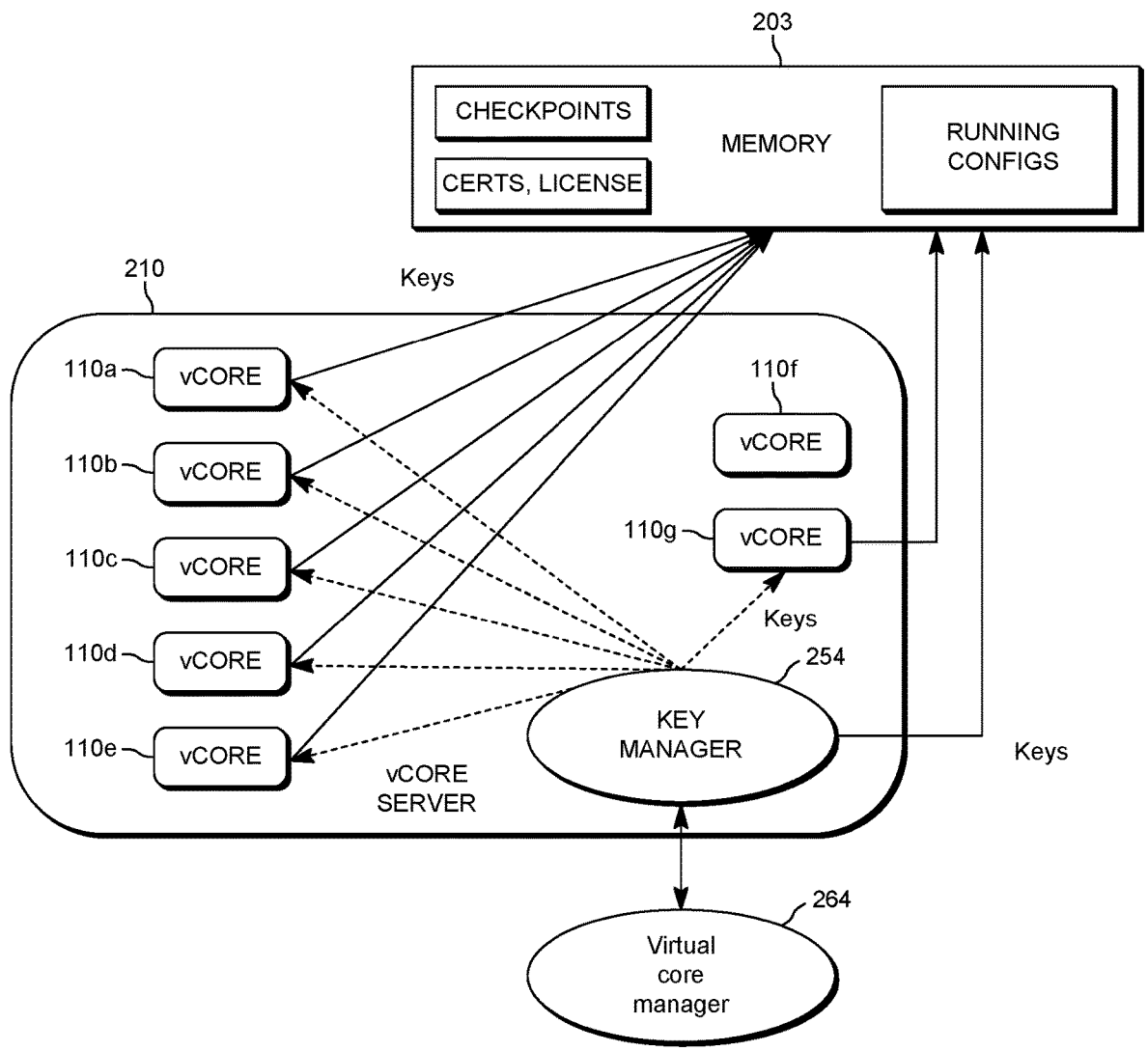
FIGS. 2C-2D depict checkpointing operations within a vCORE server system prior to and following a failover according to some embodiments.
Figure 2D:
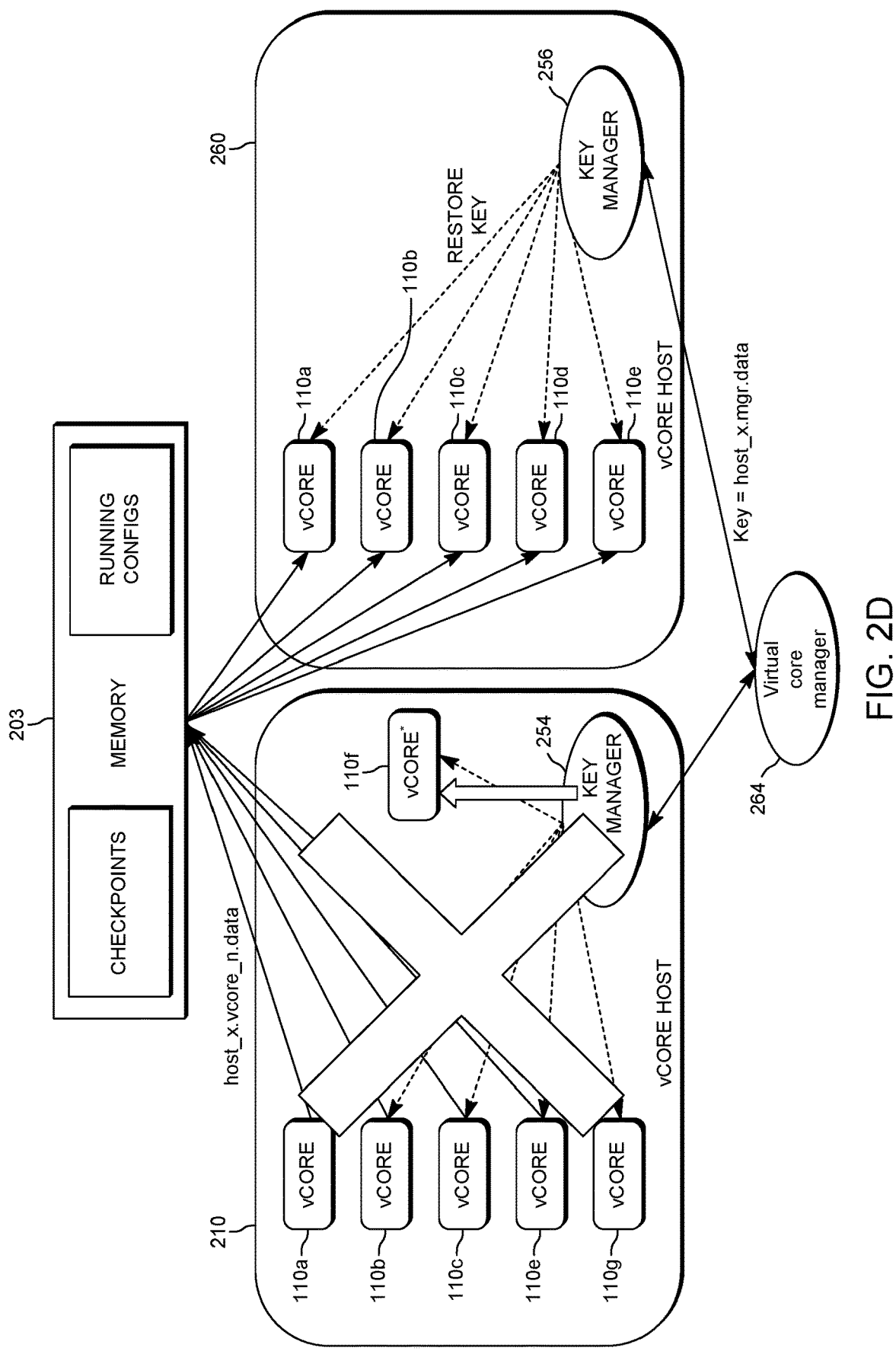

FIGS. 2C-2D depict in more detail checkpointing operations within a virtual CMTS core server system prior to and following a failover according to some embodiments. As noted, vCORE checkpointing is a process such that stateful information from primary (e.g., active) virtual CMTS cores 110a, 110b, 110c, 110d, 110e is cached in memory 203 and readily available to a secondary (e.g., standby) virtual CMTS core 110f, 110g in the event a primary virtual CMTS core is lost. Examples of checkpoint information include the stateful information, certificates (CERTS), licenses, and running configurations.

One approach to checkpointing of virtual CMTS core state data is to use an in-memory data cache 203. In-memory data caches are capable of storing and retrieving data using key-value pairs where the value may be a simple data element or complex structure of multiple data elements and types. The keys are indexed for fast lookup when retrieving data. Hash-maps may also be used to store application state data to enable fast lookup. In-memory data caches 203 may be advantageous over external databases since they are typically fast access, but external databases may be used. In a server cluster, an in-memory data cache may be deployed across one or many hosts within the cluster such that the data cache itself has redundancy in the event of a host failure. In advanced configurations, the in-memory data cache may replicate the data store throughout the cluster to provide even faster access to applications as well as redundancy in the event of a host failure.

In this depiction of FIG. 2C, virtual CMTS core 110 is associated with an in-memory data cache 203, which is depicted here as a separate function external to the vCORE server 210 to reflect the fact that the data cache 203 need not be constrained to be within the vCORE server 210. Checkpoint information from each primary virtual CMTS cores 110a, 110b, 110c, 110d, 110e may be conveyed directly to the data cache 203 where it is replicated throughout the cluster to ensure robustness against loss of any specific server 210. As noted above, a checkpoint key manager 254 on redundancy management system 102 (or vCORE Host manager) is responsible for managing the mapping of virtual CMTS core 110 with the data cache keys. In the event of a primary virtual CMTS core 110 failure, key manager 254 function may provide the appropriate key associated with the failed virtual CMTS core 110 to a secondary virtual CMTS core 110. This secondary (now active as a backup) virtual CMTS core 110 may then access all checkpoint information directly using the key. Such key manager 254 may be part of the server 210 or may be external to the server 210 (e.g., as part of a separate redundancy management system). Also, it may be desirable to implement this such that the key manager 254 itself has checkpoint data backup in the event it fails or resides on a host that fails, e.g., in a virtual core manager 264.

FIG. 2D depicts the use of the in-memory data cache 203 in the event of a full host failure. In such event, the virtual core manager 264 may provide a checkpoint for the failed key manager 254 to a redundant (e.g., standby) key manager 256 available in another server 110. Such redundant key manager 256 may then point each available replacement virtual CMTS cores 110a, 110b, 110c, 110d, 110e in server 260 to the appropriate data cache key for restoring checkpoints from failed virtual CMTS cores 110a, 110b, 110c, 110e, 110g of the failed server 210. As noted, the redundant key manager 256 may be part of virtual core manager 264, which may be part of the server 260 or elsewhere.

Such use of a cluster based in-memory data cache 203 offers advantages over checkpointing in an appliance-based CMTS in which a main chassis with a set of slots for hardware processor boards provides such functionality. As noted, checkpointing in a CMTS environment involves saving state information associated with each of the hardware processor boards. In the event of a hardware processor board failure, a redundant hardware processor board (e.g., installed in the same CMTS chassis) may come online and quickly restore state using the checkpoint information. However, in an appliance-based CMTS, checkpointing is stored within the chassis itself with no checkpointing between multiple CMTS chassis. Hence, in the event of a CMTS chassis failure, all checkpointing data is lost, and a replacement CMTS must be brought online and perform a full initialization process with all attached consumer premises equipment.

Figure 3:
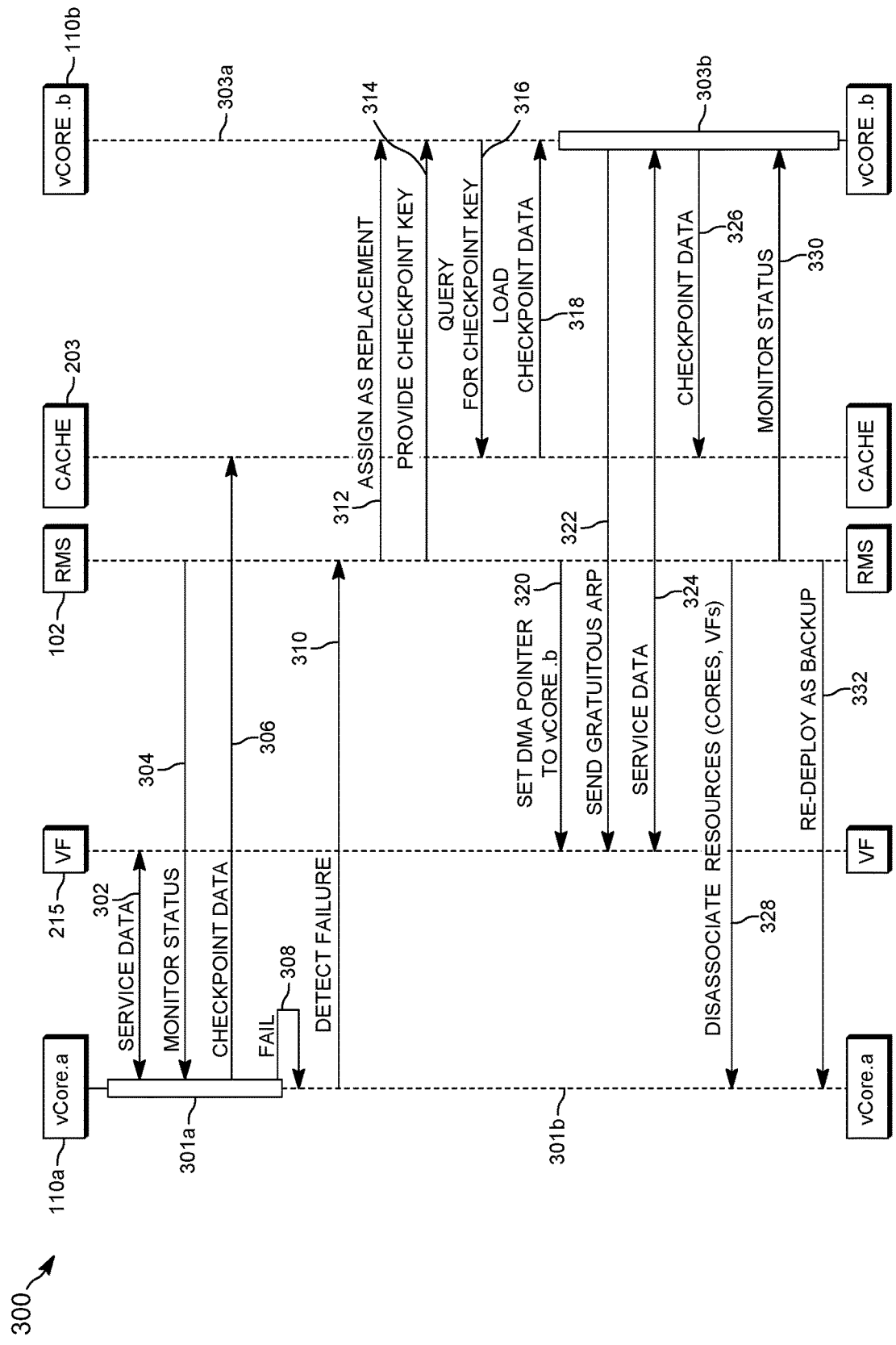
FIG. 3 depicts tasks performed during monitoring of virtual CMTS core operations, maintaining of checkpointing data, detection of a virtual CMTS core failure, and configuration and restoration of a backup virtual CMTS core according to some embodiments.

FIG. 3 depicts a process 300 that is performed during monitoring of virtual CMTS core operations, maintaining of checkpointing data, detection of a failure of a virtual CMTS core 110a, and configuration and restoration of a backup virtual CMTS core 110b according to some embodiments. The process includes tasks, as discussed above, identified for monitoring virtual CMTS core operations, maintaining checkpointing data, and detecting a virtual CMTS core failure during pre-failure mode 301a and post-failure mode 301b for an initial virtual CMTS core 110a, and configuration and restoration during pre-configured mode 303a and post-configured mode 303b of a backup virtual CMTS core 110b.

When a virtual CMTS core 110a is initially launched a startup configuration may be initiated, e.g., including a set of command line instructions (CLI) with each instruction providing a specific setting in the virtual CMTS core configuration, with the startup configuration maintained in a database. Over the course of a virtual CMTS core lifetime, other CLI may be provided to the virtual CMTS core 110a in addition to those provided in the startup configuration. Hence, a running configuration represents the full set of CLI provided to the virtual CMTS core, e.g., with the startup configuration and all CLI provided after startup saved in the memory cache.

After launch, as discussed above, at 302, during normal operation 301a of a virtual CMTS core 110a, service data may be accessed by a virtual function 215 associated with the virtual CMTS core 110a while operating status of the virtual CMTS core 110a may be monitored 304 by redundancy management system 102. Meanwhile, at 306, virtual CMTS core 110a may collect checkpoint data (as discussed in more detail above) and send the data to cache memory 203. These tasks may continue in such manner until such time as the virtual CMTS core 110a experiences a failure 308.

At 310, redundancy management system 102 detects the failure. In response to redundancy management system 102 detecting the failure, at 312, redundancy management system 102 may initiate assignment of a replacement virtual CMTS core 110b. The assignment is to a predeployed virtual CMTS core. At 314, redundancy management system 102 also provides a checkpoint key to the replacement virtual CMTS core 110b to allow replacement virtual CMTS core 110b to recover the state of failed virtual CMTS core 110a. For example, at 316, replacement virtual CMTS core 110b issues a query 316 to the cache 203 as a request to load the checkpoint data. The request includes the checkpoint key, which looks up checkpoint data stored in cache 203. At 318, replacement virtual CMTS core 110b loads the checkpoint data from cache 203.

Meanwhile, redundancy management system 102 may perform functions to migrate the service from failed virtual CMTS core 110a to replacement virtual CMTS core 110b. For example, at 320, redundancy management system 102 may set a DMA pointer in the virtual function 215 to the newly assigned replacement virtual CMTS core 110b, which, now in its post-configured mode 303b. In post-configured mode 303b, at 322, replacement virtual CMTS core 110b may send a gratuitous address resolution protocol (ARP) request to the VF 215 to ensure the MAC address is updated, and at 324, access service data from virtual function 215. The service data may include operation data needed to operate replacement virtual CMTS core 110b as a replacement for failed virtual CMTS core 110a.

Once the replacement virtual CMTS core 110b has begun operating, at 316, replacement virtual CMTS core 110b may then begin sending its own checkpoint data for storage in the cache memory 203. Replacement virtual CMTS core 110b may use the same key in which checkpoint data from failed virtual CMTS core 110a was retrieved or may use a different key to store the new checkpoint data. Also, at 328, redundancy management system 102 causes disassociation(s) of resources for the failed virtual CMTS core 110a. The disassociation may ensure that packets are not routed to the disconnected failed virtual CMTS core 110a. Additionally, at 330, redundancy management system 102 begins monitoring core operations of the replacement virtual CMTS core 110b. The monitoring may be checking for a failure of virtual CMTS core 110b. At 332, redundancy management system 102 re-deploys the failed virtual CMTS core 110a as a potential backup for future re-assignment.

Accordingly, a virtualized CMTS core 110 is provided to allow a service provider to increase the scale at which CMTSs are deployed without requiring dedicated and specialized hardware. To account for failures, redundancy management system 102 is used to store state information about the operation of a virtual CMTS core 110a, and allow a replacement virtual CMTS core 110b to take over for a failed virtual CMTS core 110a in event of a failure with minimal disruptions to service.

The computational power of microprocessor based common off the shelf (COTS) server platforms are increasing while the expense of such systems is decreasing over time. With such systems, a computing system may be virtualized and operated using one or more COTS server, generally referred to herein as a virtual machine. It is to be understood that the virtual machine may be in the form of a classical virtual machine, may be in the form of container technology, such as docker containers, or otherwise. Using container technologies, the COTS server may operate with only a single operating system. Each of the virtualized applications may then be isolated using software containers, such that the virtualized application may not see and is not aware of other virtualized applications operating on the same machine. Typically, each COTS server include one or more Intel/AMD processors (or other processing devices) with associated memory and networking capabilities running an operating system software. Typically, the COTS include a framework and an operating system where user applications are run on such framework and operating system abstracted away from the actual operating system. Each virtual machine may be instantiated and operated as one or more software applications running on a COTS server. A plurality of COTS servers are typically included in one or more data centers, each of which are in communication with one another. A plurality of COTS may be located in different geographic areas to provide geo-redundancy.

The software processes that are included on a line card may be run on a virtual machine running on a COTS server, including both the "active" and "back-up" software processes. The functionality provided by such a virtual machine may include higher level functions such as for example, packet processing that includes routing Internet packet provisioning, layer 2 virtual private networking which operates over pseudowires, and multiprotocol label switching routing. The functionality provided by such a virtual machine may include DOCSIS functions such as for example, DOSCSIS MAC and encapsulation, channel provisioning, service flow management, quality of service and rate limiting, scheduling, and encryption. The functionality provided by such a virtual machine may include video processing such as for example, EQAM and MPEG processing. The functionality provided by such a virtual machine may include access interfaces, such as for example, passive optical network, quadrature amplitude modulation downstream, single carrier quadrature amplitude modulation upstream, orthogonal frequency divisional multiplexing downstream, and orthogonal quadrature frequency division multiple access upstream.

Each of the COTS servers and/or the virtual machines may contain different hardware profiles and/or frameworks. For example, each of the COTS servers and/or virtual machines may include different processor types, different number of processing cores per processor, different amounts of memory for each processor type, different amounts of memory per processing core, different cryptographic capabilities, different amounts of available off-processor memory, different memory bandwidth (DDR) speeds, and varying types and capabilities of network interfaces, such as Ethernet cards. In this manner, different COTS servers and/or virtual machines may have different processing capabilities that vary depending on the particular hardware. Each of the COTS servers and/or the virtual machine may contain different software profiles. For example, each of the COTS servers and/or virtual machines may include different software operating systems and/or other services running thereon, generally referred to herein as frameworks. In this manner, different COTS servers and/or virtual machines may have different software processing capabilities that vary depending on the particular software profile.

An "active" software process, including the functionality of part or all of a CMTS processes, may be run on the COTS server and/or virtual machine. A "back-up" software process, including the functionality of part or all of a CMTS processes, may be run on the COTS server and/or virtual machine. In addition to the "back up" software process running on the COTS server and/or virtual machine, other processes may be running, including a redundancy management system. As the system increasingly scales to support additional customers, additional COTS servers and/or virtual machines are included with the system to expand the processing capability of the overall system. To provide processing redundancy, one or more additional COTS servers and/or virtual machines may be included that are assigned as "back-up". In the event of a failure of one of the "active" COTS servers and/or virtual machines, such as a failed software process and/or a failed hardware, the redundancy management software processes assigns one of the "back-up" COTS servers and/or virtual machines to be "active" by migrating the processing previously performed by the failed COTS server and/or virtual machine to the assigned "back-up". In some cases, the "back-up" virtual machines and the "active" virtual machines may be co-located on the same COTS server.

Figure 7:
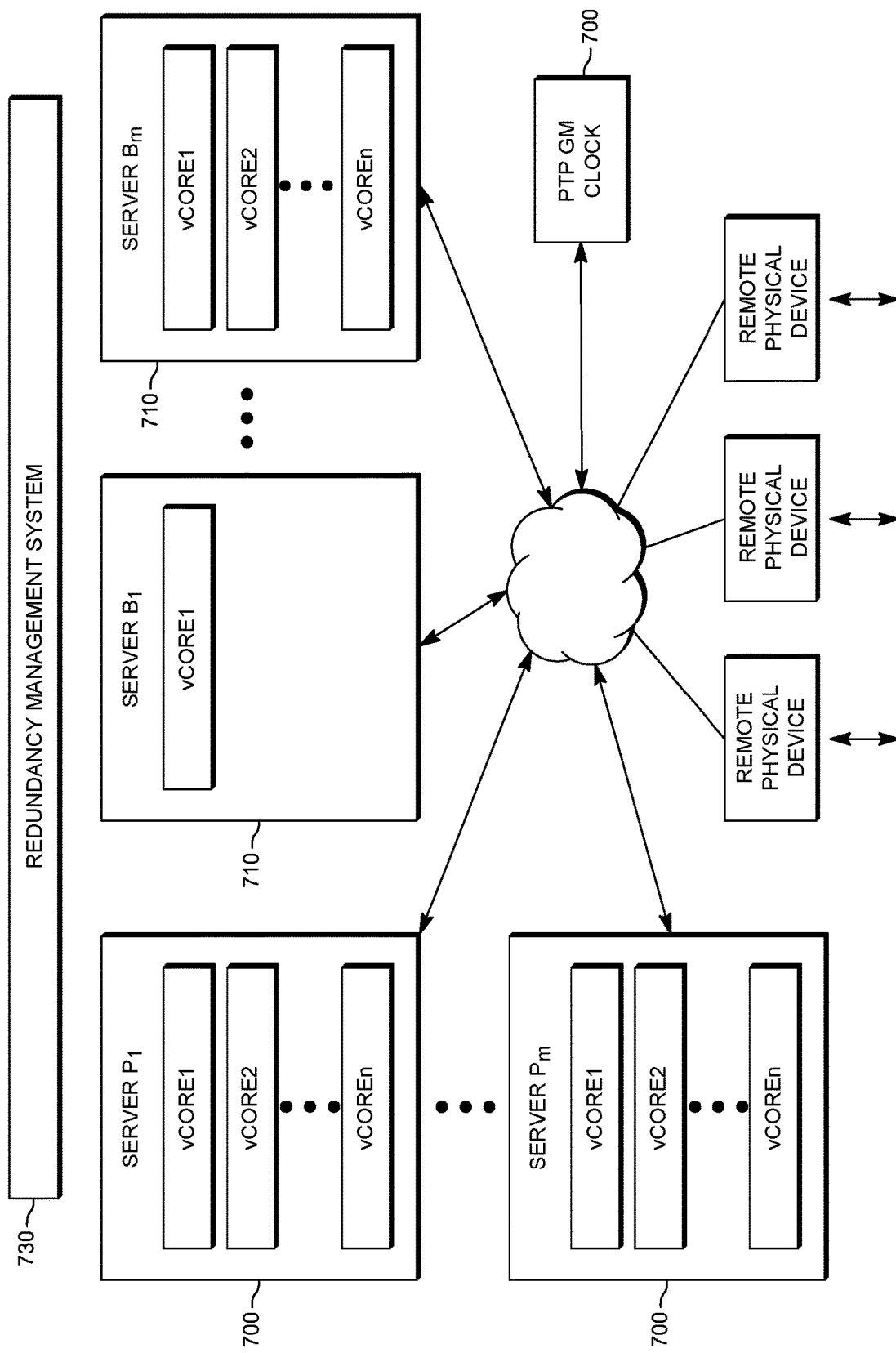
FIG. 7 illustrates a modified distributed Cable Modem Termination System.

Referring to FIG. 7, an exemplary architecture of various components of an exemplary system is illustrated. A data center may include one or more "active" COTS servers (or other type of server) 700 generally designated as $P_{1...m}$. Each of the "active" COTS servers may include one or more virtual machines generally designated as $vCore_{1...n}$. The data center may include one or more "back-up" COTS servers (or other type of server) 710 generally designated as $B_{1...m}$. Each of the "back-up" COTS servers may include one or more virtual machines generally designated as $vCore_{1...n}$. The data center may include a redundancy management system 730 that is operating on one of the virtual machines, and preferably on one of the virtual machines of a back-up COTS or a separate COTS management server with a virtual machine operating thereon. Locating the redundancy management system on a separate COTS management server isolates it from the other virtual CMTS instances that perform packet forwarding. In the event of a failure of one of the "active" COTS servers and/or virtual machines, such as a failed software process and/or a failed hardware, the redundancy management system processes assigns one of the "back-up" COTS servers and/or virtual machines to be "active" by migrating the processing previously performed by the failed COTS server and/or virtual machine to the assigned "back-up".

Figure 8:
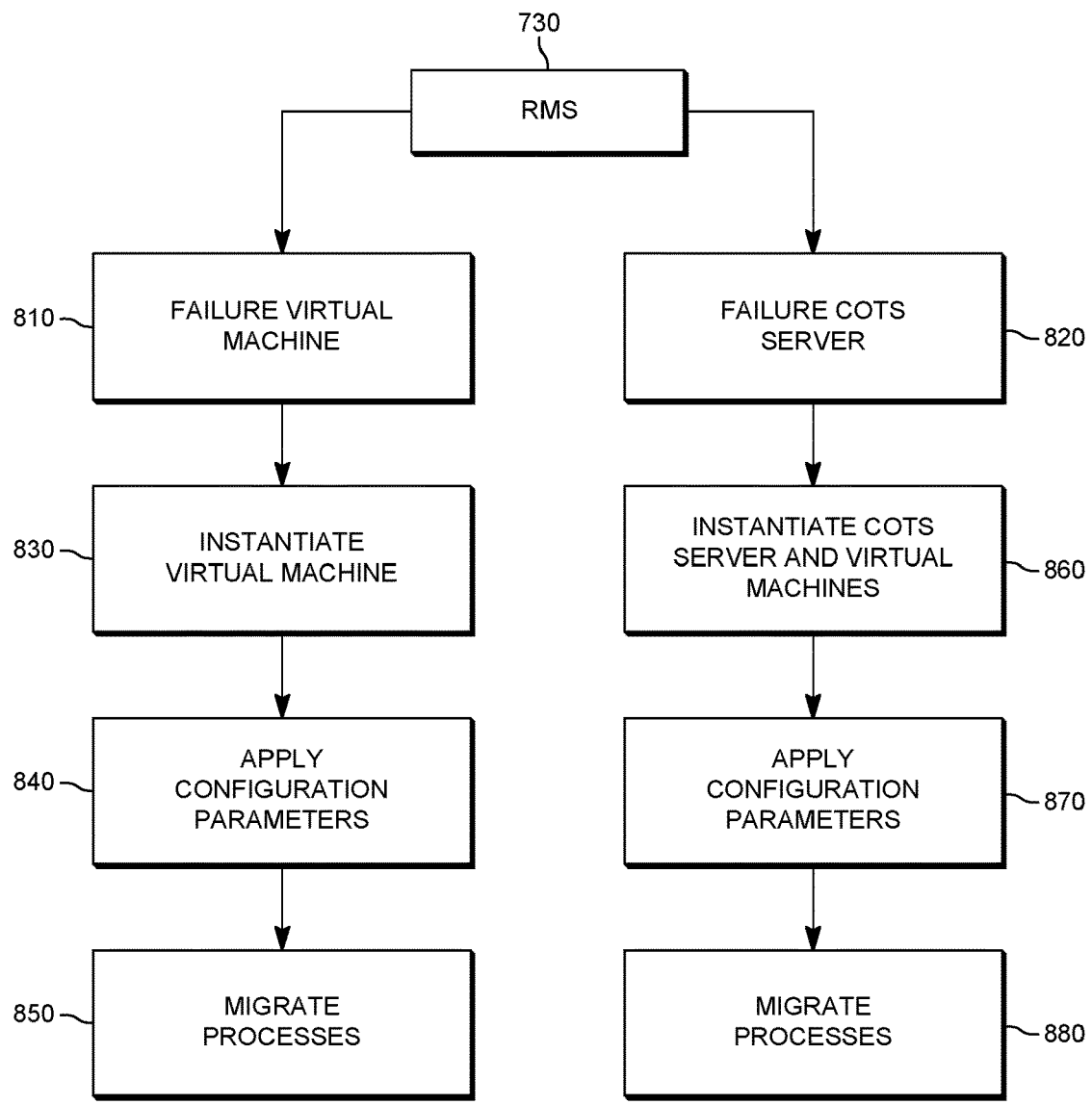
FIG. 8 illustrates a failure switching mechanism for a Cable Modem Termination System.
Figure 9:
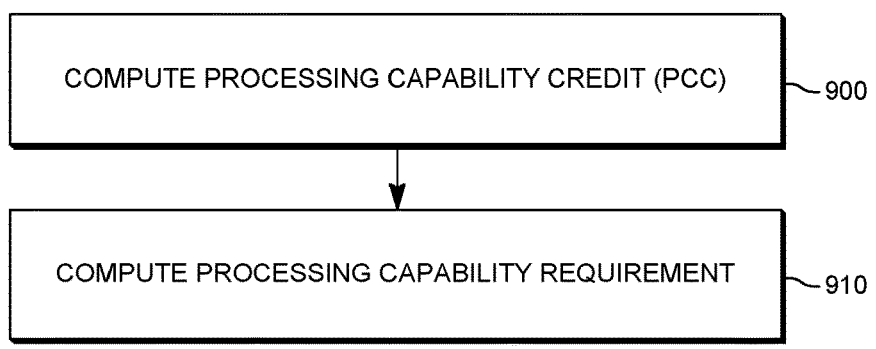
FIG. 9 illustrates a characterization mechanism for a Cable Modem Termination System.

Referring to FIG. 8, the redundancy management system (RMS) may detect different types of failures, such as the failure of a portion of a virtual machine and/or the failure of a COTS server. By way of example, the failure of the virtual machine 810 may be the result of a software error. By way of example, the failure of the COTS server 820, and all the virtual machines operating thereon, may be the result of a power-supply failure.

As a result of detecting the failure of an individual virtual machine 810 the RMS 730 may instantiate a new virtual machine instance 830 in a back-up server with the same configuration parameters as that of the failed virtual machine instance. Preferably, the back-up server already has one or more virtual machine instances already up and running without configuration parameters. Thereby, upon detecting a failure of a virtual machine instance, the RMS may apply matching configuration parameters 840 of the failed virtual machine instance to one of the already running back-up virtual machine instances running on the back-up server. The processes of the failed virtual machine are migrated to the newly instantiated virtual machine 850.

As a result of detecting the failure of a COTS server 820 the RMS 730 may instantiate a new COTS server together with the virtual machines 860 previously operating on the failed COTS server as a new back-up server with the same configuration parameters as that of the failed COTS server and virtual machine instances. Preferably, the back-up server already has one or more virtual machine instances already up and running without configuration parameters. Thereby, upon detecting a failure of a COTS server, the RMS may apply matching configuration parameters 870 of the failed COTS server and virtual machine instances to a corresponding set of the already running back-up virtual machine instances running on the back-up server. The processes of the failed COTS server and virtual machine(s) are migrated to the newly instantiated COTS server and virtual machine(s) 480.

In some cases, depending on the particular available COTS servers $P_1, P_2, \ldots, P_m$ the backup COTS servers $B_1, B_2, \ldots, B_m$ do not have identical hardware profiles. For example, the COTS servers may have different processor types, different number of processing cores per processor, different amounts of memory for each processor type, different amounts of memory per processing core, different amounts of available off-processor memory, different memory bandwidth (DDR) speeds, different frameworks, and varying types and capabilities of network interfaces, such as Ethernet cards. Therefore, the RMS system, may make a choice of where to run the failed virtual machine instances upon detection of a failure.

Referring to FIG. 5, the RMS 730 may compute the processing capability of a given COTS server to assess the feasibility of running one or more virtual machine instances on it. The RMS may compute a Processing Capacity Credit (PCC) 900 attribute for each COTS server, including active and back-up COTS servers. The PCCs depends on various parameters of the COTS servers such as for example, number of physical processing cores available (Nc), max clock frequency of the cores (Fc), cache memory size (Cs), number of virtual network functions (Nvf) and unallocated bandwidth supported by the Ethernet interface card, among other things. PCC for a given server, as shown below, may be a function of various server attributes.

$$PCC=f(Nc,Fc,Cs,Nvf) \qquad \text{Equation 1:}$$

While equation 1 illustrates PPC as a function, in practice the various parameters are typically discrete values and it may be more feasible for the RMS to maintain a table look-up (i.e., another representation of the function) to determine a PCC value for a given server configuration. The function, and more preferably look-up table, is preferably pre-computed by running profiling software on the RMS COTS server that primarily estimates the packet processing capability of a COTS server based upon different parameter values.

The RMS may also compute a Processing Capacity Requirement (PCR) 910 for each virtual machine instance. The PCR for a given virtual machine depends on various factors such as for example, maximum downstream throughput (TmaxDS), maximum upstream throughput (TmaxUS), number of customers (Nsub) serviced by the virtual machine instance, encryption type (Encr), and average packet size (Npkt). The PCR for a given virtual machine instance, may be a function of various attributes as shown below:

$$PCR=f(T \max DS, T \max US, Nsub, Encr, Npkt) \qquad \text{Equation 2:}$$

Similar to computation of PCC values for a server, PCR values for a given virtual machine instance may be computed a priori using profiling software, preferably running on the RMS server, that estimates the PCR for various vales of the attributes in the function shown above.

It should be noted that the PCC and PCR values may be dynamic. Configuration changes to a running virtual machine can result in changes to its PCR values. Similarly, PCC values for a server goes down as more virtual cores are scheduled to run on it. Therefore, the RMS should periodically monitor the status of the server configurations and virtual machine configurations to update the PCC values and the PCR values.

The RMS may handle two primary types of failures:

A first type of failures are the ones that cause individual virtual machines instances to fail due to error conditions associated with that virtual machine. To handle this type of error, the RMS stores the PCR value associated with each virtual machine. When a virtual machine instance fails, the RMS compares the PCR value of the failed virtual machine with the PCC values of all back-up servers. If the PCR value is larger than all the PCC values, then there are insufficient resources to back-up the failed virtual machine instance and nothing needs to be done. If there are one or more back-up servers with PCC values larger than the PCR, then the RMS chooses the server with the smaller PCC values to back-up the failed virtual machine instance. The motivation behind this choice is to "fully-load" selected back-up servers rather than spreading the virtual machines instances over a large number of servers. This provides the capability of "fully loading" selected back-up servers rather than spreading the virtual machines instances over a large number of servers.

A second type of failure are the ones caused by error conditions in a server that impacts all the virtual machine instances running in that server. To handle this type of error, the RMS computes the sum of the PCR values associated with all the instances in the failed server. If the PCR value of one or more back-up servers is larger than this sum value, then the RMS chooses the back-up server with the smallest PCC value (that is larger than sum of PCR values). If none of the back-up servers have a PCC value larger than the sum value, then the RMS treats individual virtual machine instance failures as first type of failure and follows the process involved for handling the first type of errors.

Another approach may be to find the largest PCC values available in the cluster and split the virtual machines into groups that fit into the available PCCs. This may be faster than doing the individual ones.

In another embodiment, the RMS may incorporate synchronization to the PTP Grand Master Clock in choosing the back-up servers. Unlike conventional software applications, virtual machines for CATV are primarily data-forwarding engines/routes that deal with stateful information for packet processing. In addition, DOCSIS MAC processor in the virtual machine and the PHY processor in the RPD should have time synchronization to successfully implement DOCSIS protocols in a distributed fashion. This time synchronization may be accomplished by both the virtual machine and the RPDs synchronizing their clock to a Grand Master (GM) clock using the Precision Time Protocol (PTP). In the I-CMTS scenario, there is a single PTP client on the I-CMTS which is synchronized to the GM clock. When a line-card fails, software functions from that line-card are switched over to the back-up line-card and the new line-card continues to use the same PTP client's synchronized clock. However, in the virtual machine scenario each server has a PTP client that is synchronized to the GM clock.

RMS can incorporate the PTP synchronization status to choose back-up servers in the following ways:

If there are more than one back-up server with PCC values larger than the PCR values (as described in the first and second type failures above), then the RMS prioritizes back-up servers that are actively synced to the GM clock compared to the ones that are in hold-over. Hold-over is a state whereby the server has lost connectivity, possibility temporarily, with the GM clock.

The RMS can extract several pieces status information from the PTP synchronization software running in the back-up servers, e.g., estimated frequency offset, estimated phase offset. This status information may be used to qualitatively order the back-up servers on how well their clocks are synchronized with the GM clock. This ordering may be used in the selection of back-up servers while responding to either type of failure previously discussed.

In some embodiments, a method comprises: monitoring, by a computing device, a first operation state of a first virtual cable modem termination system core that is running as a first virtualized application on the computing device, wherein operation data for the operation state is stored based on operation of the first virtual cable modem termination system core; responsive to a detection of a failure of the first virtual cable modem termination system core, enabling, by the computing device, operation of a second virtual cable modem termination system core, wherein the second virtual cable modem termination system core is running as a second virtualized application; and providing, by the computing device, information for the operation data to the second virtual cable modem termination system core to allow the second virtual cable modem termination system core to update a second operation state of the second virtual cable modem termination system core using the operation data.

In some embodiments, monitoring the first operation state of the first virtual cable modem termination system core comprises periodically checking a status of the first virtual cable modem termination system core.

In some embodiments, monitoring the first operation state of the first virtual cable modem termination system core comprises periodically performing one of transmitting a heartbeat message, transmitting a polling message, and transmitting a ping message to the first virtual cable modem termination system core.

In some embodiments, the operation data is stored in a memory that is external to the computing device.

In some embodiments, enabling operation of the second virtual cable modem termination system core comprises assigning the second virtual cable modem termination system core as a replacement for the first virtual cable modem termination system core.

In some embodiments, enabling operation of the second virtual cable modem termination system core comprises sending a location of the operation data to the second virtual cable modem termination system core.

In some embodiments, the second virtual cable modem termination system core uses the location to retrieve the operation data.

In some embodiments, the second virtual cable modem termination system core is running prior to the failure being detected.

In some embodiments, the operation data comprises a plurality of operation states that are stored during the operation of the first virtual cable modem termination system core.

In some embodiments, the method further comprises updating a configuration that specifies an address to address packets to the second virtual cable modem termination system core.

In some embodiments, updating the configuration comprises changing a first memory location of the first virtual cable modem termination system core to a second memory location of the second virtual cable modem termination system core.

In some embodiments, updating the configuration comprises changing a first address of the first virtual cable modem termination system core to a second address of the second virtual cable modem termination system core.

In some embodiments, the method further comprises, responsive to the detection of the failure, disassociating one or more resources previously associated with the first virtual cable modem termination system core.

In some embodiments, a non-transitory computer-readable storage medium contains instructions that, when executed, control a computer system to be operable for: monitoring a first operation state of a first virtual cable modem termination system core that is running as a first virtualized application on the computing device, wherein operation data for the operation state is stored based on operation of the first virtual cable modem termination system core; responsive to a detection of a failure of the first virtual cable modem termination system core, enabling operation of a second virtual cable modem termination system core, wherein the second virtual cable modem termination system core is running as a second virtualized application; and providing information for the operation data to the second virtual cable modem termination system core to allow the second virtual cable modem termination system core to update a second operation state of the second virtual cable modem termination system core using the operation data.

In some embodiments, monitoring the first operation state of the first virtual cable modem termination system core comprises periodically checking a status of the first virtual cable modem termination system core.

In some embodiments, monitoring the first operation state of the first virtual cable modem termination system core comprises periodically performing one of transmitting a heartbeat message, transmitting a polling message, and transmitting a ping message to the first virtual cable modem termination system core.

In some embodiments, the operation data is stored in a memory that is external to the computing device.

In some embodiments, enabling operation of the second virtual cable modem termination system core comprises assigning the second virtual cable modem termination system core as a replacement for the first virtual cable modem termination system core.

In some embodiments, enabling operation of the second virtual cable modem termination system core comprises sending a location of the operation data to the second virtual cable modem termination system core.

In some embodiments, an apparatus comprises: one or more computer processors; and a non-transitory computer-readable storage medium comprising instructions, that when executed, control the one or more computer processors to be operable for: monitoring a first operation state of a first virtual cable modem termination system core that is running as a first virtualized application on the computing device, wherein operation data for the operation state is stored based on operation of the first virtual cable modem termination system core; responsive to a detection of a failure of the first virtual cable modem termination system core, enabling operation of a second virtual cable modem termination system core, wherein the second virtual cable modem termination system core is running as a second virtualized application; and providing information for the operation data to the second virtual cable modem termination system core to allow the second virtual cable modem termination system core to update a second operation state of the second virtual cable modem termination system core using the operation data.

Figure 4:
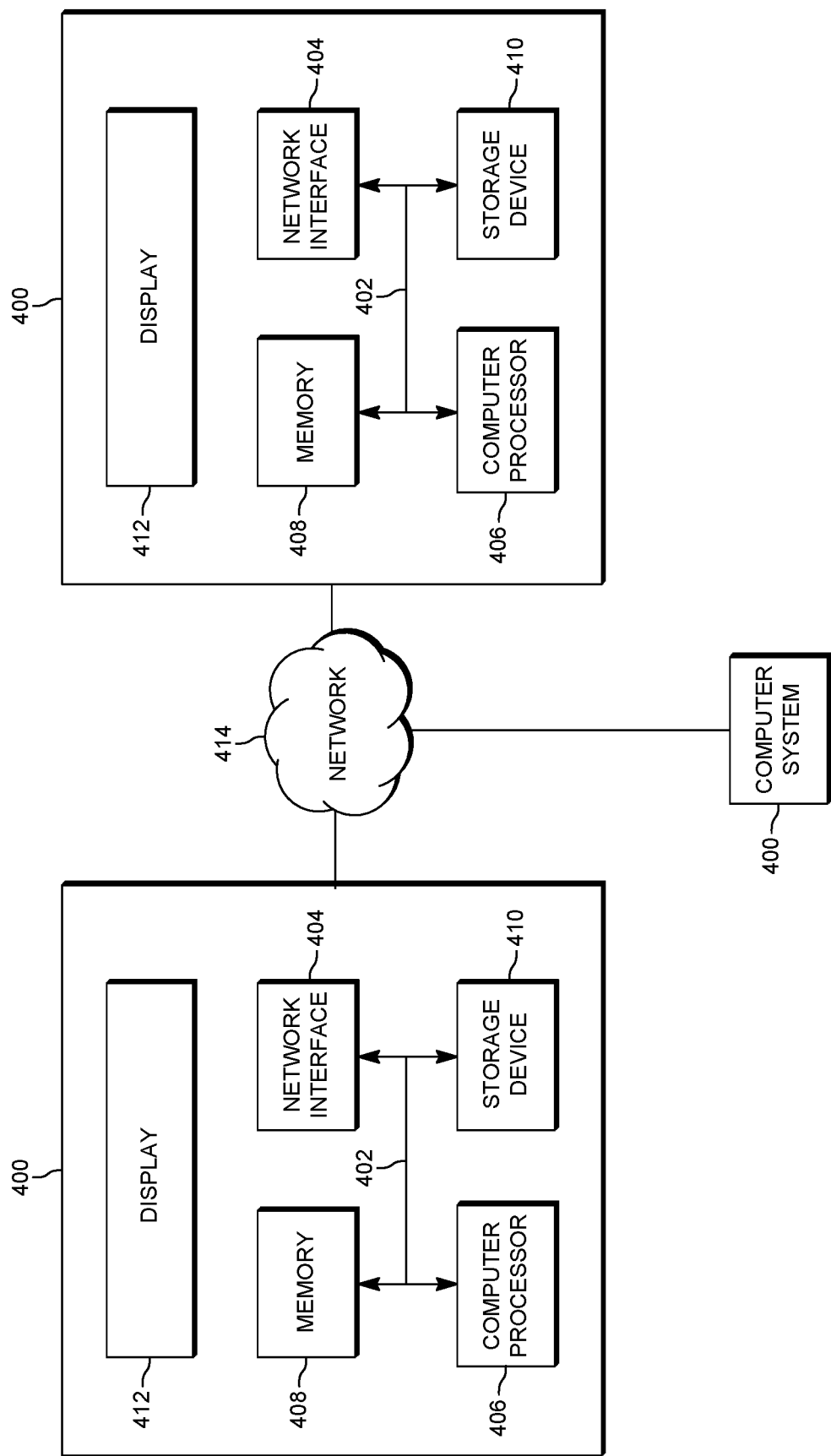
FIG. 4 illustrates an example of special purpose computer systems according to one embodiment.

FIG. 4 illustrates an example of special purpose computer systems 400 according to one embodiment. Computer system 400 includes a bus 402, network interface 404, a computer processor 406, a memory 408, a storage device 410, and a display 412 that may be shared among multiple computer systems.

Bus 402 (or multiple buses) may be a communication mechanism for communicating information. Computer processor 406 may execute computer programs stored in memory 408 or storage device 408. Any suitable programming language can be used to implement the routines of some embodiments including C, C++, Java, assembly language, etc. Different programming techniques can be employed such as procedural or object oriented. The routines can execute on a single computer system 400 or multiple computer systems 400. Further, multiple computer processors 406 may be used.

Memory 408 may store instructions, such as source code or binary code, for performing the techniques described above. Memory 408 may also be used for storing variables or other intermediate information during execution of instructions to be executed by processor 406. Examples of memory 408 include random access memory (RAM), read only memory (ROM), or both.

Storage device 410 may also store instructions, such as source code or binary code, for performing the techniques described above. Storage device 410 may additionally store data used and manipulated by computer processor 406. For example, storage device 410 may be a database that is accessed by computer system 400. Other examples of storage device 410 include random access memory (RAM), read only memory (ROM), a hard drive, a magnetic disk, an optical disk, a CD-ROM, a DVD, a flash memory, a USB memory card, or any other medium from which a computer can read.

Memory 408 or storage device 410 may be an example of a non-transitory computer-readable storage medium for use by or in connection with computer system 400. The non-transitory computer-readable storage medium contains instructions for controlling a computer system 400 to be configured to perform functions described by some embodiments. The instructions, when executed by one or more computer processors 406, may be configured to perform that which is described in some embodiments.

Computer system 400 includes a display 412 for displaying information to a computer user. Display 412 may display a user interface used by a user to interact with computer system 400.

Computer system 400 also includes a network interface 404 to provide data communication connection over a network, such as a local area network (LAN) or wide area network (WAN). Wireless networks may also be used. In any such implementation, network interface 404 sends and receives electrical, electromagnetic, or optical signals that carry digital data streams representing various types of information.

Computer system 400 can send and receive information through network interface 404 across a network 414, which may be an Intranet or the Internet. Computer system 400 may interact with other computer systems 400 through network 414. In some examples, client-server communications occur through network 414. Also, implementations of some embodiments may be distributed across computer systems 400 through network 414.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

Moreover, each functional block or various features in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. A cable system comprising:
   (a) a head end connected to a plurality of modems through a network interface controller that is interconnected to a transmission network that includes a node that converts digital data to analog data suitable for said plurality of modems, where said head end includes at least one server that includes a processor with a plurality of virtual machines operating on said at least one server;
   (b) wherein said plurality of virtual machines are connected to said network interface controller, wherein a plurality of virtual network interface controllers are associated with said network interface controller, where each of said plurality of virtual machines are associated with a different one of said virtual network interface controllers, wherein each of said plurality of virtual machines is without knowledge of the data usage of other virtual network interface controllers than its own virtual network interface controller, wherein each of said plurality of virtual network interface controllers is configured to have has less data carrying capacity than said network interface controller;
   (c) said head end including a management process that detects the failure of at least one of (1) said at least one server having an associated sever IP address and (2) one of said plurality of virtual machines having an associated virtual machine IP address;
   (d) said head end in response to detecting said failure of at least one of (1) said at least one server and (2) said one of said plurality of virtual machines migrating services operating on respective said one of said plurality of virtual machines to at least one of (1) a different server that is assigned said associated server IP address that is already running without configuration parameters configured for said plurality of modems and (2) a different virtual machine that is assigned said associated virtual machine IP address that is already running without configuration parameters configured for said plurality of modems;
   (e) where said migrating services is based upon determining at least one of (1) a server processing capability of a plurality of different servers each of which has a different processing capability and (2) a virtual machine processing capability of a plurality of different virtual machines each of which has a different processing capability, and selecting a respective one of said different server and said different virtual machine based upon said server processing capability and said virtual machine processing capability, respectively.

2. The cable system of claim 1 wherein said head end receives packetized video, receives packetized data from a network, and transmits packetized data to said network.

3. The cable system of claim 2 wherein said head end transmits downstream data to selected ones of said plurality of modems, transmits downstream video to selected ones of said plurality of modems, and receives upstream data from selected ones of said plurality of modems.

4. The cable system of claim 1 wherein said transmission network includes a remote PHY that includes at least one of a quadrature amplitude modulator and an orthogonal frequency division modulator.

5. The cable system of claim 1 wherein said management process detects the failure of said at least one virtual machine.

6. The cable system of claim 5 wherein said management process determines the processing capabilities of said different virtual machine to be at least as great as processing capabilities of the failed said one of said plurality of virtual machines prior to said migration.

7. The cable system of claim 6 wherein said processing capabilities of the failed one of said plurality of virtual machines is based upon at least one of a maximum downstream throughput, a maximum upstream throughput, a number of customers services by said one of said plurality of virtual machines, an encryption type, and an average packet size of said one of said plurality of virtual machines.

8. The cable system of claim 1 wherein said management process detects the failure of said at least one server.

9. The cable system of claim 8 wherein said management process determines the processing capabilities of said different server to be at least as great as processing capabilities of the failed said at least one server prior to said migration.

10. The cable system of claim 9 wherein said processing capabilities of the failed said at least one server is based upon at least one of a number of physical processing cores available, a max clock frequency of the cores, a cache memory size, and a number of virtual network functions of said at least one server.

11. The cable system of claim 1 wherein said different server and said different virtual machine is synchronized to a Grand Master Clock.

12. A method of modifying a cable system comprising the steps of:
(a) connecting a head end to a plurality of modems through a network interface controller that is interconnected to a transmission network that includes a node that converts digital data to analog data suitable for said plurality of modems, where said head end includes at least one server that includes a processor with a plurality of virtual machines operating on said at least one server;
(b) wherein said plurality of virtual machines are connected to said network interface controller, wherein a plurality of virtual network interface controllers are associated with said network interface controller, where each of said plurality of virtual machines are associated with a different one of said virtual network interface controllers, wherein each of said plurality of virtual machines is without knowledge of the data usage of other virtual network interface controllers than its own virtual network interface controller, wherein each of said plurality of virtual network interface controllers is configured to have has less data carrying capacity than said network interface controller;
(c) detecting by a management process at said head end the failure of at least one of (1) said at least one server having an associated server IP address and (2) one of said plurality of virtual machines having an associated virtual machine IP address;
(d) in response to detecting said failure at said head end of at least one of (1) said at least one server and (2) said one of said plurality of virtual machines migrating services operating on respective said one of plurality of virtual machines to at least one of (1) a different server that is assigned said associated server IP address that is already running without configuration parameters configured for said plurality of modems and (2) a different virtual machine that is assigned said associated virtual machine IP address that is already running without configuration parameters configured for said plurality of modems;
(e) where said migrating services is based upon determining at least one of (1) a server processing capability of a plurality of different servers each of which has a different processing capability and (2) a virtual machine processing capability of a plurality of different virtual machines each of which has a different processing capability, and selecting a respective one of said different server and said different virtual machine based upon said server processing capability and said virtual machine processing capability, respectively.

13. The method of claim 12 wherein said transmission network includes a remote PHY that includes a quadrature amplitude modulator.

14. The method of claim 12 wherein said management process detects the failure of said one of said plurality of virtual machines.

15. The method of claim 14 wherein said management process determines the processing capabilities of said different virtual machine to be at least as great as processing capabilities of the failed said one of said plurality of virtual machines prior to said migration.

16. The method of claim 15 wherein said processing capabilities of the failed said one of said plurality of virtual machines is based upon at least one of a maximum downstream throughput, a maximum upstream throughput, a number of customers services by said one of said plurality of virtual machines, an encryption type, and an average packet size of said one of said plurality of virtual machines.

17. The method of claim 12 wherein said management process detects the failure of said at least one server.

18. The method of claim 17 wherein said management process determines the processing capabilities of said different server to be at least as great as processing capabilities of the failed said at least one server prior to said migration.

19. The method of claim 18 wherein said processing capabilities of the failed said at least one server is based upon at least one of a number of physical processing cores available, a max clock frequency of the cores, a cache memory size, and a number of virtual network functions of said at least one server.

20. The method of claim 12 wherein said different server and said different virtual machine is synchronized to a Grand Master Clock.

21. A cable system comprising:
(a) a head end connected to a plurality of modems through a network interface controller that is interconnected to a transmission network that includes a node that converts digital data to analog data suitable for said plurality of modems, where said head end includes at least one server that includes a processor with a plurality of virtual machines operating on said at least one server;
(b) wherein said plurality of virtual machines are connected to said network interface controller, wherein a plurality of virtual network interface controllers are associated with said network interface controller, where each of said plurality of virtual machines are associated with a different one of said virtual network interface controllers, wherein each of said plurality of virtual machines is without knowledge of the data usage of other virtual network interface controllers than its own virtual network interface controller, wherein each of said plurality of virtual network interface controllers is configured to have has less data carrying capacity than said network interface controller;

(c) said head end including a management process that detects the failure of at least one of (1) said at least one server having an associated server IP address and (2) one of said plurality of virtual machines having an associated virtual machine IP address;

(d) one of said plurality of virtual machines synchronizing its clock to a grand master clock and said node synchronizing its clock to said grand master clock;

(e) said remote management process in response to detecting said failure of at least one of (1) said at least one server and (2) said one of said plurality of virtual machines migrating services operating on respective one of said plurality of virtual machines to at least one of (1) a different server that is assigned said associated server IP address that is already running without configuration parameters configured for said plurality of modems and (2) a different virtual machine that is assigned said associated server IP address that is already running without configuration parameters configured for said plurality of modems while prioritizing said different server and said different virtual machine based upon whether said different server and said different virtual machine is synchronized to said grand master clock;

(f) where said migrating services is based upon determining at least one of (1) a server processing capability of a plurality of different servers each of which has a different processing capability and (2) a virtual machine processing capability of a plurality of different virtual machines each of which has a different processing capability, and selecting a respective one of said different server and said different virtual machine based upon said server processing capability and said virtual machine processing capability, respectively.

22. The cable system of claim 21 wherein said prioritizing is based upon said at least one of said different server and said different virtual machine having a processing capacity credit larger than a processing capacity requirement of another different server and another virtual machine.

23. A method comprising:
(a) monitoring, by a computing device, a first operation state of a plurality of virtual cable modem termination system cores that are running as a respective first virtualized application on the computing device, wherein operation data for the operation state is stored based on operation of the plurality of virtual cable modem termination system cores;

(b) wherein said plurality of virtual cable modem termination system cores are connected to said network interface controller, wherein a plurality of virtual network interface controllers are associated with said network interface controller, where each of said plurality of virtual cable modem termination system cores are associated with a different one of said virtual network interface controllers, wherein each of said plurality of virtual cable modem termination system cores is without knowledge of the data usage of other virtual network interface controllers than its own virtual network interface controller, wherein each of said plurality of virtual network interface controllers is configured to have has less data carrying capacity than said network interface controller;

(c) responsive to a detection of a failure of one of the first virtual cable modem termination system cores, enabling, by the computing device, operation of a second one of the virtual cable modem termination system cores that is already running without configuration parameters configured for said first virtual cable modem termination system core wherein the second virtual cable modem termination system core is running as a second virtualized application; and (d) providing, by the computing device, information for the operation data to the second virtual cable modem termination system core to allow the second virtual cable modem termination system core to update a second operation state of the second virtual cable modem termination system core using the operation data;

(e) where said migrating services is based upon determining a processing capability of a plurality of virtual cable modem termination system cores each of which has a different processing capability, and selecting said second virtual cable modem termination system based upon said processing capability.

24. The method of claim 23, wherein monitoring the first operation state of the first virtual cable modem termination system core comprises periodically checking a status of the first virtual cable modem termination system core.

25. The method of claim 24, wherein monitoring the first operation state of the first virtual cable modem termination system core comprises periodically performing one of transmitting a heartbeat message, transmitting a polling message, and transmitting a ping message to the first virtual cable modem termination system core.

26. The method of claim 23, wherein enabling operation of the second virtual cable modem termination system core comprises assigning the second virtual cable modem termination system core as a replacement for the first virtual cable modem termination system core.

27. The method of claim 23, wherein enabling operation of the second virtual cable modem termination system core comprises sending a location of the operation data to the second virtual cable modem termination system core.

28. The method of claim 23, further comprising updating a configuration that specifies an address to address packets to the second virtual cable modem termination system core.

29. The method of claim 23, further comprising, responsive to the detection of the failure, disassociating one or more resources previously associated with the first virtual cable modem termination system core.

* * * * *